(12) United States Patent
Tzamaloukas et al.

(10) Patent No.: US 12,340,636 B2
(45) Date of Patent: *Jun. 24, 2025

(54) VEHICLE DATA EXTRACTION SERVICE

(71) Applicant: Amazon Technologies, Inc., Seattle, WA (US)

(72) Inventors: Assimakis Tzamaloukas, San Jose, CA (US); Anis Moussa, Berlin (DE); Jeffrey Dean Singer, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,222

(22) Filed: Dec. 18, 2023

(65) Prior Publication Data
US 2024/0185648 A1 Jun. 6, 2024

Related U.S. Application Data

(63) Continuation of application No. 17/160,184, filed on Jan. 27, 2021, now Pat. No. 11,887,411.

(51) Int. Cl.
G07C 5/08 (2006.01)
H04L 12/40 (2006.01)

(52) U.S. Cl.
CPC .............. G07C 5/08 (2013.01); H04L 12/40 (2013.01); H04L 2012/40215 (2013.01); H04L 2012/40273 (2013.01)

(58) Field of Classification Search
CPC . G07C 5/08; H04L 12/40; H04L 2012/40215; H04L 2012/40273; H04L 67/565; H04L 67/12
See application file for complete search history.

(56) References Cited

U.S. PATENT DOCUMENTS 5,400,018 A 3/1995 Scholl
7,103,460 B1 9/2006 Breed
(Continued)

FOREIGN PATENT DOCUMENTS

CN 103241239 A 8/2013
CN 103793787 5/2014
(Continued)

OTHER PUBLICATIONS

Lili Zhang et al., "A DRM System Based on PKI", 2010 Fourth International Conference on Genetic and Evolutionary Computing, IEEE, 2010, pp. 522-525.
(Continued)

Primary Examiner — Calvin Cheung
(74) Attorney, Agent, or Firm — Alexander A. Knapp; Kowert, Hood, Munyon, Rankin & Goetzel, P.C.

(57) ABSTRACT

A system comprising one or more computing devices implements a vehicle information extraction service. The vehicle information extraction service enables customers to provide access to proprietary encoding protocols used by the customers to communicate over a bus of a vehicle, wherein the proprietary protocols are used by the vehicle information extraction service to perform vehicle information monitoring, while at the same time protecting the confidentiality of the proprietary protocols from being accessed by third parties. Also, the vehicle information extraction service enables streaming of relevant vehicle information corresponding to customer defined event criteria without requiring non-relevant vehicle information to be streamed, which would consume considerable network resources.

20 Claims, 15 Drawing Sheets

(56) References Cited

U.S. PATENT DOCUMENTS

| | | |
|---|---|---|
| 7,715,961 B1 | 5/2010 | Kargupta |
| 8,930,402 B1 | 1/2015 | Sing |
| 9,104,537 B1 | 8/2015 | Penilla |
| 9,280,653 B2 | 3/2016 | Forest |
| 9,430,225 B2 | 8/2016 | Ko |
| 9,854,442 B2 | 12/2017 | Mazzara, Jr. |
| 9,984,420 B1 | 5/2018 | Manzell |
| 10,540,892 B1 | 1/2020 | Fields |
| 10,666,767 B1 | 5/2020 | Floyd |
| 10,802,481 B1 | 10/2020 | Menon |
| 11,025,598 B1 | 6/2021 | Laghaelan |
| 11,037,177 B1 | 6/2021 | Chan |
| 11,553,363 B1 | 1/2023 | Chan |
| 11,790,458 B1 | 10/2023 | Menon |
| 11,887,411 B2 | 1/2024 | Tzamaloukas et al. |
| 11,902,374 B2 | 2/2024 | Srinivasan et al. |
| 2002/0007237 A1 | 1/2002 | Phung |
| 2003/0009270 A1 | 1/2003 | Breed |
| 2003/0055666 A1 | 3/2003 | Roddy |
| 2003/0093199 A1 | 5/2003 | Mavreas |
| 2007/0026876 A1 | 2/2007 | Freilich |
| 2008/0080459 A1 | 4/2008 | Kotecha |
| 2009/0171548 A1 | 7/2009 | Hyde |
| 2010/0228404 A1 | 9/2010 | Link, II |
| 2011/0224865 A1 | 9/2011 | Gordon |
| 2012/0041638 A1 | 2/2012 | Johnson |
| 2013/0275761 A1 | 10/2013 | Catsburg |
| 2014/0059534 A1 | 2/2014 | Daum |
| 2014/0073254 A1 | 3/2014 | Ichihara et al. |
| 2014/0075198 A1 | 3/2014 | Peirce |
| 2014/0079217 A1 | 3/2014 | Bai |
| 2014/0123123 A1 | 5/2014 | Bahls |
| 2014/0195100 A1 | 7/2014 | Lunggsgaard |
| 2014/0228061 A1 | 8/2014 | Draznin |
| 2015/0105933 A1 | 4/2015 | Martin |
| 2015/0180840 A1 | 6/2015 | Jung |
| 2015/0193220 A1 | 7/2015 | Rork |
| 2015/0286475 A1 | 10/2015 | Vangelov |
| 2015/0288636 A1 | 10/2015 | Yalavarty |
| 2015/0301821 A1 | 10/2015 | Danne |
| 2016/0078695 A1 | 3/2016 | McClintic |
| 2016/0099806 A1 | 4/2016 | Racklyeft et al. |
| 2016/0099927 A1 | 4/2016 | Oz |
| 2016/0140779 A1 | 5/2016 | Takenaka |
| 2016/0196131 A1 | 7/2016 | Searle |
| 2016/0330032 A1 | 11/2016 | Naim et al. |
| 2017/0086054 A1 | 3/2017 | Azevedo |
| 2017/0187787 A1 | 6/2017 | Syamala |
| 2017/0193026 A1 | 7/2017 | Pettovello |
| 2017/0200324 A1 | 7/2017 | Chennakeshu |
| 2017/0242678 A1 | 8/2017 | Sangameswaran |
| 2017/0251339 A1 | 8/2017 | Addepalli |
| 2017/0262274 A1 | 9/2017 | Vangelov |
| 2017/0315797 A1 | 11/2017 | Vangelov |
| 2017/0331795 A1 | 11/2017 | Martin |
| 2017/0358204 A1 | 12/2017 | Modica |
| 2018/0024826 A1 | 1/2018 | Caushi |
| 2018/0048473 A1 | 2/2018 | Miller |
| 2018/0081670 A1 | 3/2018 | Caushi |
| 2018/0088589 A1* | 3/2018 | Hasegawa ............. B60W 30/00 |
| 2018/0091596 A1 | 3/2018 | Alvarez |
| 2018/0145991 A1 | 5/2018 | McCauley |
| 2018/0189103 A1* | 7/2018 | Teshler ................... H04L 67/10 |
| 2018/0196656 A1 | 7/2018 | Miller |
| 2018/0196660 A1* | 7/2018 | Rivas Silva ...... H04L 12/40169 |
| 2018/0217828 A1 | 8/2018 | Madrid |
| 2018/0217831 A1 | 8/2018 | Madrid |
| 2018/0310159 A1 | 10/2018 | Katz |
| 2019/0050220 A1 | 2/2019 | Daum |
| 2019/0065933 A1 | 2/2019 | Bogdoll |
| 2019/0080528 A1 | 3/2019 | Bednar |
| 2019/0087168 A1 | 3/2019 | Carranza |
| 2019/0088104 A1 | 3/2019 | Crewe |
| 2019/0140886 A1 | 5/2019 | Zywicki |
| 2019/0146775 A1 | 5/2019 | Wang |
| 2019/0206156 A1 | 7/2019 | Ponda |
| 2019/0212348 A9 | 7/2019 | Schwoebel |
| 2019/0258727 A1 | 8/2019 | Schmotzer et al. |
| 2019/0259223 A1 | 8/2019 | Sangameswaran |
| 2019/0279440 A1 | 9/2019 | Ricci |
| 2019/0304213 A1 | 10/2019 | Chen |
| 2019/0311556 A1 | 10/2019 | Thron |
| 2019/0391800 A1 | 12/2019 | Lin et al. |
| 2020/0028946 A1 | 1/2020 | Vora |
| 2020/0029209 A1 | 1/2020 | Nolscher |
| 2020/0043063 A1 | 2/2020 | London |
| 2020/0074864 A1 | 3/2020 | McErlean |
| 2020/0089487 A1 | 3/2020 | Ramic et al. |
| 2020/0111272 A1 | 4/2020 | Ferre Fabregas |
| 2020/0114910 A1 | 4/2020 | Han |
| 2020/0162912 A1 | 5/2020 | Schaaf |
| 2020/0198651 A1 | 6/2020 | Levy |
| 2020/0213820 A1* | 7/2020 | Sim ..................... H04L 61/4541 |
| 2020/0234249 A1 | 7/2020 | Chamon |
| 2020/0234515 A1 | 7/2020 | Gronsbell |
| 2020/0313873 A1 | 10/2020 | Mondello |
| 2020/0334924 A1 | 10/2020 | Wells |
| 2020/0364953 A1 | 11/2020 | Simoudis |
| 2020/0410787 A1 | 12/2020 | Petousis |
| 2021/0012588 A1 | 1/2021 | Kwon |
| 2021/0058814 A1 | 2/2021 | Puranic |
| 2021/0101607 A1 | 4/2021 | Du |
| 2022/0237958 A1 | 7/2022 | Tzamaloukas et al. |
| 2022/0294685 A1 | 9/2022 | Li |
| 2022/0377142 A1* | 11/2022 | Yamamoto .............. H04L 67/12 |
| 2023/0102153 A1 | 3/2023 | Floyd |
| 2023/0115145 A1 | 4/2023 | Sanchez |
| 2023/0169805 A1 | 6/2023 | Ramnani et al. |
| 2023/0171314 A1 | 6/2023 | Srinivasan et al. |
| 2023/0260336 A1 | 8/2023 | Nishie |

FOREIGN PATENT DOCUMENTS

| | | | |
|---|---|---|---|
| CN | 110351314 | 10/2019 | |
| CN | 113590359 | 11/2021 | |
| CN | 114338542 | 4/2022 | |
| EP | 2736225 | 5/2014 | |
| EP | 3700243 A1 * | 8/2020 | ............. G06F 21/44 |
| EP | 3319266 | 1/2021 | |
| FR | 3003382 | 9/2014 | |
| GB | 2525654 | 11/2015 | |
| JP | 2002202895 A | 7/2002 | |
| JP | 2007214696 A | 8/2007 | |
| JP | 2010061512 A | 3/2010 | |
| JP | WO2013094001 A1 | 4/2015 | |
| JP | 2019160199 A | 9/2019 | |
| JP | 2019175089 A | 10/2019 | |
| JP | 2020035014 A | 3/2020 | |
| KR | 20170025955 | 3/2017 | |
| WO | 2007092247 | 8/2007 | |
| WO | 2012160668 A1 | 11/2012 | |
| WO | 2017058724 | 4/2017 | |
| WO | 2017217070 | 12/2017 | |
| WO | 2018057321 | 3/2018 | |
| WO | 2019126707 | 6/2019 | |
| WO | 2019213177 | 11/2019 | |
| WO | 2020097221 | 5/2020 | |
| WO | 2020183954 | 9/2020 | |
| WO | 2020191225 | 9/2020 | |
| WO | 2020235641 A1 | 11/2020 | |
| WO | 2022069033 | 7/2022 | |

OTHER PUBLICATIONS

Mattias Ohrn, "Publice Key Infrastructure Utilisation in Digital Rights Management", KTH Numerical Analysis and Computer Science, 2004, pp. 1-84.

Sayfan, Gigi, "Matering Kubernetes," May 17, 2017, Packt Publishing Ltd., Birmingham UK.

U.S. Appl. No. 17/164,720, filed Feb. 1, 2021, David Joseph Mifsud, et al.

(56) References Cited

OTHER PUBLICATIONS

International Search Report and Written Opinion mailed May 11, 2022 in International Application No. PCT/US2022/013862, pp. 1-12.
Jiyong Han, et al., "GS1 Connected Car: An Integrated Vehicle Information Platform and Its Ecosystem for Connected Car Services based on GS1 Standards", 2018 IEEE Intelligent Vehicles Symposium (IV), IEEE, Jun. 26, 2018, pp. 367-374.
Office Action mailed Aug. 13, 2024 in Japanese Patent Application No. 2023-544278, Amazon Technologies, Inc., pp. 1-5 (incluting translation).

* cited by examiner

700

Vehicle Information Extraction Service Webpage

◯ https://<website>.com/VIES Webpage

Welcome to the Vehicle Information Extraction Service.

Here, you can define a real-world vehicle to be linked to the submitted vehicle model, wherein the specified types of data in the vehicle model are populated with data extracted from the linked real-world vehicle.

722

| Enter Identifying Information for Vehicle to be Linked to Vehicle Model | | |
|---|---|---|
| | Unique Vehicle Identifier | ########### — 724 |
| | VIN Number | — 726 |
| | License Plate | — 728 |
| | Owner's Name | — 730 |
| | Owner's Email | — 732 |
| | Country/ Language | USA/English — 734 |

736 — Enter!

Vehicle Information Extraction Service Webpage

◯ https://<website>.com/VIES Webpage

Welcome to the Vehicle Information Extraction Service.

Here, you can define a gateway or other component of the real-world vehicle for deployment of a software package configured to perform data extraction as defined in the vehicle model.

742

| Enter Identifying Information for Software Package Deployment Destination (e.g. Gateway) | Name | Gateway 1 | — 744 |
| | Proxy Server | 127.0.0.1:1234 | — 746 |
| | Operating System/ Run Time Environment | ########## | — 748 |
| | Network Interface | ########## | — 750 |
| | Install Directory | ######## | — 752 |

⋮

754 — [Enter!]

FIG. 7C

VEHICLE DATA EXTRACTION SERVICE

PRIORITY APPLICATION

This application is a continuation of U.S. patent application Ser. No. 17/160,184, filed Jan. 27, 2021, which is hereby incorporated by reference herein in its entirety.

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicle. Some vehicles may include as many as 70 such electronic control units (ECUs) and 20-30 sensor modalities or more. These components communicate with one another over one or more buses of the vehicle and format the data being communicated using proprietary encoding formats and protocols. Also, access credentials may be required to access data flows on such buses.

Additionally, modern vehicles increasingly include more sensors that generate more data than previous vehicles. For example, autonomous, semi-autonomous, or self-driving vehicles may include multiple cameras, radars, LIDAR sensors, audio microphones, etc. Such sensors may generate significant amounts of data, e.g. 5-10 terabytes of data per hour or more.

Typically, vehicles only have a limited capacity to store data such that most, if not all, data generated by such sensors and/or data communicated over buses of the vehicle is not stored in a way that the data is later accessible for analysis or troubleshooting. Also, to the extent data is stored, the data is often stored in a format that is not discernable without access to a specialized tool provided by the vehicle manufacturer to interpret proprietary encoding formats and protocols, such as a fault code reader/diagnostic tool that connects to an on-board diagnostics connector of the vehicle. Moreover, such specialized tools may only enable limited viewing of a subset of the vehicle information communicated over buses of the vehicle.

BRIEF DESCRIPTION OF THE DRAWINGS

FIGS. 7A-7F illustrate example user interface pages that are used to define and enable data extraction from a vehicle or fleet of vehicles, according to some embodiments.

Figure 1:
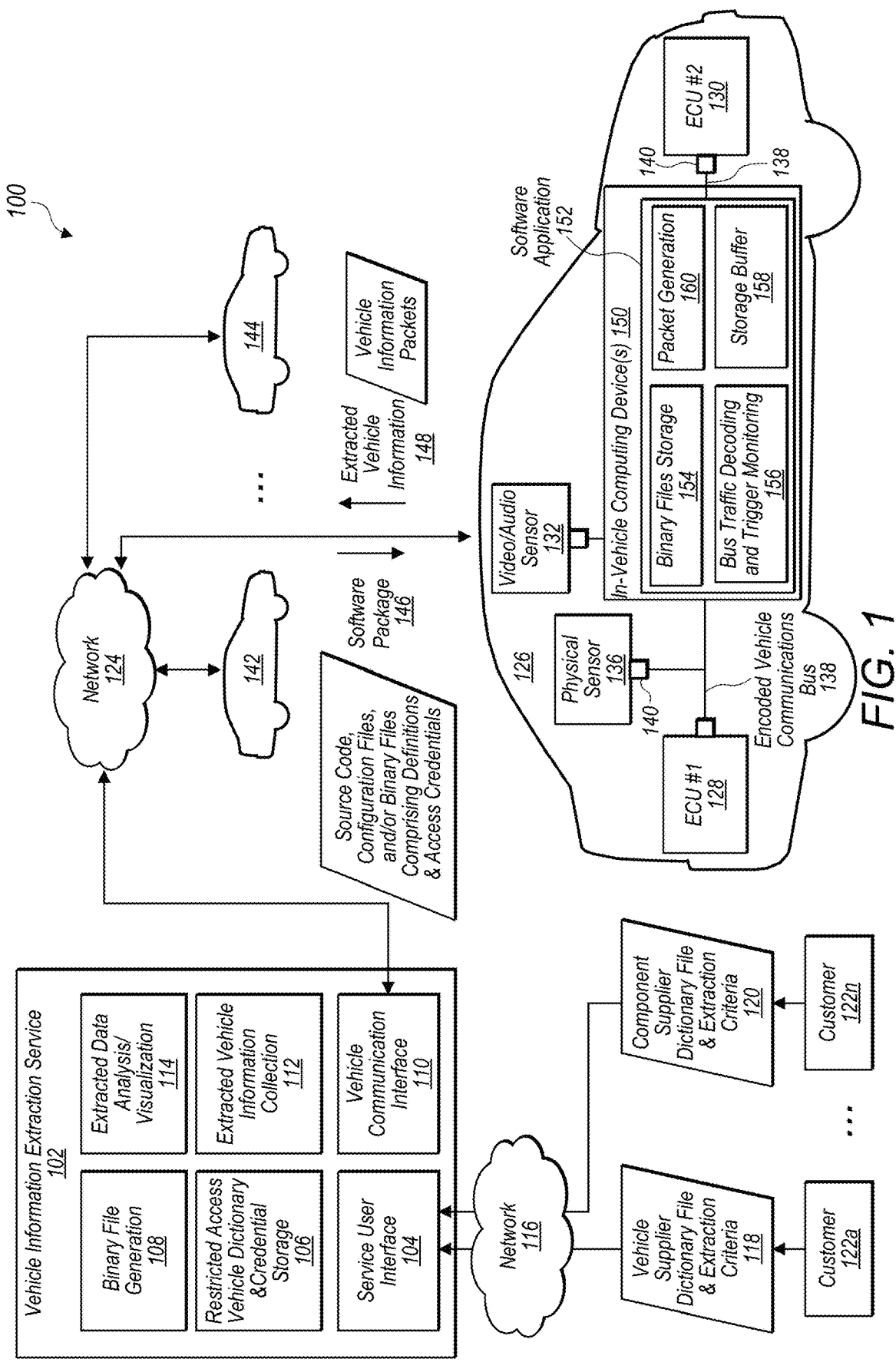
FIG. 1 illustrates a vehicle information extraction service that receives access credentials and dictionaries with proprietary encoding formats used by a vehicle supplier or component part suppliers to format vehicle information communicated over a vehicle bus, wherein the vehicle information extraction service maintains confidentiality of the proprietary access credentials and encoding formats while deploying software packages to vehicles to monitor vehicle information encoded using the proprietary encoding formats and requiring the proprietary access credentials for extraction if one or more triggering conditions are met, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle information extraction service and implementing in-vehicle data monitoring and extraction using a software package generated by a vehicle information extraction service.

In some embodiments, a vehicle information extraction service is implemented in a service provider network, such as a service provider that offers cloud-based services to customers of the service provider network. In some embodiments, customers of a vehicle information extraction service may be vehicle suppliers (such as original equipment manufacturers (OEMs) and/or vehicle components suppliers (such as tier 1, tier 2, or tier 3 parts suppliers). Also, in various embodiments, the vehicle supplier or vehicle component supplier may offer vehicle health monitoring services to vehicle owners or other third parties using data extracted from vehicles.

In some embodiments, a system for implementing a vehicle data extraction service comprises computing devices configured to generate one or more binary files to be deployed to one or more vehicles to be monitored for data extraction. The binary files may be generated using a proprietary dictionary of the vehicle supplier or a proprietary dictionary of the vehicle component supplier, wherein contents of the propriety dictionary are stored by the service provider in a restricted access logical or physical container that prevents the service provider offering the vehicle extraction service from fully viewing the contents of the propriety dictionary and also prevents other third parties from viewing the contents of the propriety dictionary. The binary files may also include proprietary access credentials that are required in order for a software application executing in the vehicle to gain access to ports or other sources of the vehicle information that has been encoded using the formats described in the proprietary dictionary. However, the vehicle supplier or the vehicle component supplier may provide the vehicle information extraction service at least partial access to the proprietary dictionary and proprietary access credentials in order to generate the one or more binary files. In some embodiments, the proprietary access credentials may be included in the dictionary provided by the vehicle supplier or vehicle component supplier, or may be separately provided. Also, in some embodiments, both the proprietary dictionary and the proprietary access credentials may be stored in a restricted access logical or physical container of the provider network that prevents the provider network operator and other third parties from viewing the contents of the restricted access logical or physical container.

In some embodiments, a software package generated by a vehicle information extraction service for deployment in a vehicle may include source code for a software agent that executes in a gateway (or other deployment destination) of the vehicle as well as a binary file used by the software agent to parse encoded bus communications. Additionally, the software package may include a configuration file that indicates what types of vehicle information are to be monitored and what triggering criteria are to be applied in order to trigger extraction of the monitored vehicle information. In some embodiments, a vehicle information extraction service may enable a customer to change vehicle information configuration parameters, such as what types of vehicle information are to be monitored and what trigger criteria are to be applied for data extraction. This may be done remotely using an API or console of the vehicle information extraction service. In such embodiments, the vehicle information extraction serve may generate an updated (or new) configuration file to be deployed to a vehicle to change types of vehicle information monitored and/or triggering conditions for extraction. Also, in some embodiments, a vehicle information extraction service may generate an updated (or new) binary file to be deployed to the vehicle to provide additional dictionaries and/or access credentials.

A binary file may be configured to enable a software application, deployed to a vehicle to be monitored, to access and interpret bus traffic on a bus of the vehicle, wherein the bus traffic is formatted and/or encoded using proprietary encoding formats and/or structures of the vehicle supplier or vehicle component supplier that are formatted in accordance with definitions defined in the proprietary dictionary. For example, the proprietary dictionary may include definitions for interpreting such encoding structures and formats. Also the proprietary dictionary or related proprietary files stored in the restricted access container may include proprietary access credentials associated with the proprietary dictionary that may be required to gain access to the encoded vehicle information. However, the binary file does not contain the full contents of the dictionary or proprietary access credential files in an easily readable format and cannot be used to easily reverse engineer the proprietary dictionary and proprietary access credential files. In some embodiments, more than one proprietary dictionary and associated proprietary access credential file may be made available for at least partial access by the vehicle extraction service, wherein different proprietary dictionaries and associated proprietary access credential files include different credentials and protocol definitions used for traffic on different buses, from different vehicle components, etc. As used herein, the proprietary dictionary and associated proprietary access credential files may also be referred to as a "dictionary" "bus database file", "protocol database file", "CAN DBC file", etc.

In some embodiments, a proprietary access credential file may include credentials for receiving communications from transmitters and transceivers that communicate over a bus of a vehicle. Also, in some embodiments, a proprietary dictionary file may define data structures and encoding formats used by transmitters and transceivers to communicate vehicle information over a bus of a vehicle. For example, the proprietary dictionary may define structures used to send messages over the bus, such as a bit signature used to signal a beginning of a message and/or a bit signature used to signal an end of a message. The proprietary dictionary may also include bit signatures used to encode "words" or "symbols" in a message. Additionally, the proprietary dictionary may include scales used to signal values in the message. To the extent abstraction layers are used in the formatting of the vehicle information sent via a bus of a vehicle, the proprietary dictionary may include information for interpreting the abstraction layers. The proprietary access credentials may be required to gain access to such bit signatures and encoded vehicle information that is then decoded using the proprietary dictionary.

In some embodiments, some or all of the information exchanged over a vehicle communication bus may be encrypted. In such cases, the automaker may provide the necessary decryption software and keys to understand the encrypted vehicle communication messages. For example, such decryption software and keys may be provided with the proprietary dictionary and stored in the restricted physical or logical access storage of the provider network. Also, such decryption software and keys may be included in a software package to be deployed to a vehicle for use in vehicle information extraction.

For example, a controller area network (CAN) bus protocol may be used to connect in-vehicle electronic control units (ECUs) with one another and exchange real-time, critical information with speeds up to 1 Mbps over a CAN bus. The CAN specification describes the physical and data link layers for high speed in-vehicle communication. Vehicle suppliers and vehicle component suppliers use the CAN bus protocol to enable time critical, low bandwidth operations. One of the key principles behind the CAN bus protocol is that each vehicle supplier/vehicle component supplier can define a proprietary CAN bus encoding that identifies every car ECU (control bits) and data to be communicated (payload of 64 bits with custom offsets and scales per parameter) in a unique manner. This allows the vehicle supplier/vehicle component supplier to protect the communication handshakes between ECUs. However, by design the CAN bus communication protocol is based on multicasting, which means that any compute device can monitor all traffic with the right decoding database (e.g. proprietary dictionary and proprietary access credentials) if attached to the same physical interface. Within a single car there may be several CAN buses, some of them made for higher speeds such as the CAN-FD (CAN with Flexible Data Rate) that can reach speeds of up to 6 Mbps. In some embodiments, a dictionary file provided by a vehicle supplier or vehicle component supplier to be securely stored by a vehicle information extraction service and made accessible for generating a binary file may include a CAN DBC file. Also a vehicle may include other buses, such as an Ethernet or IP bus, a local interconnect (LIN) bus, a Flex Ray bus, a time-triggered protocol (TTP) bus, etc. In some embodiments, different respective proprietary dictionaries may define protocols used by the different types of buses and may be made accessible to a vehicle information extraction service to generate binary files for monitoring and extracting vehicle information encoded using the respective bus protocols.

In some embodiments, a proprietary dictionary and associated proprietary access credential files received by one or more computing devices of a service provider network from a vehicle supplier or vehicle component supplier may be stored in a restricted access physical or logical container that prevents parties other than the vehicle supplier or vehicle component supplier from viewing the contents of the proprietary dictionary and proprietary access credential files. For example, a proprietary dictionary and proprietary access credential files may be stored in a storage account of a vehicle supplier or a vehicle component supplier with a storage service offered by the service provider network. As another example, a proprietary dictionary and proprietary access credential file may only be accessible via a virtual private cloud or other limited access networking configuration that limits other parties from viewing the contents of the proprietary dictionary and proprietary access credential file.

In some embodiments, in addition to providing the proprietary dictionary and proprietary access credential file, the customer (e.g. vehicle supplier or vehicle component supplier) may provide an indication of one or more types of vehicle information that are to be monitored by the vehicle extraction service and/or one or more triggering criteria for extraction of the monitored vehicle information. The one or more computing devices of the data extraction service may receive such an indication from the customer and use the indication to generate a configuration file to be supplied to the software application of the vehicle that is to be monitored. For example the configuration file and the binary file may be included in a software package that is to be deployed to a vehicle to be monitored.

Additionally, such configurations of what types of vehicle information are to be extracted and what triggering criteria are to be used to extract such vehicle information, may be remotely configurable "on-the fly" subsequent to the vehicle being put in use by a vehicle owner and without requiring physical access to the vehicle. For example, vehicles typically include components, such as ECUs, that are hard programmed with access rights that cannot be changed without physically changing out the component or otherwise re-programming the component, which requires the vehicle to be brought in to a dealership or other facility of the vehicle supplier in order for the configuration to be changed. This is because typically vehicles do not include any mechanism to provide required access credentials and proprietary encoding definitions to the hard programmed components without physically accessing the vehicle. In contrast, a vehicle information extraction service allows a vehicle supplier or vehicle component supplier to remotely reconfigure what types of vehicle information are monitored in a vehicle and what triggering criteria are to be applied to extract the monitored vehicle information from the vehicle.

For example, a vehicle supplier may log into a console or designer canvas of a vehicle information extraction service, change a vehicle monitoring configuration, and select to deploy the new configuration. In response, the vehicle information extraction service may automatically generate and deploy an updated configuration file to one or more vehicles to be monitored in order to implement the new configuration. This may be done using a wireless connection to a gateway of the one or more vehicles without requiring the one or more vehicles to be physically accessed or brought in to a dealership.

Additionally, a vehicle information extraction service may allow a customer, such as a vehicle supplier or vehicle component supplier, to define roles and associated access privileges for employees of the vehicle supplier or vehicle component supplier, or other third parties. For example, a customer support technician may be provided limited access to view vehicle information extracted according to a pre-configured extraction configuration. In contrast, a customer support engineer may be provided privileges that enable the customer support engineer to define new vehicle extraction configurations that allow greater access to more detailed vehicle information not originally configured to be extracted from the vehicle. As a further example, certain systems of a vehicle may appear as a black box in the way extracted vehicle information is provided to a customer support technician. However, if a problem is escalated to a customer support engineer, the customer support engineer may be able to use a vehicle information extraction service to define new vehicle information extraction configurations (and deploy corresponding updated configuration files) that provide the customer support engineer with the ability to view vehicle information about components within the black box that were not types of vehicle information originally configured to be extracted or collected from the vehicle. This may allow the customer support engineer to view vehicle information for sub-components within components of the vehicle, and further dig into sub-components of the sub-components, etc. in order to troubleshoot a vehicle issue, as an example.

Because vehicles generate a large quantity of data, streaming all generated data, or even all generated data for a limited number of vehicle information types, may be impractical. Thus, in some embodiments, data may only be extracted and sent to a vehicle information extraction service over an intermediate network, such as a wireless network, when the triggering conditions specified by the customer (e.g. vehicle supplier or vehicle component supplier) are met. For example, a triggering condition may be an acceleration or deceleration greater than X G's. If such a triggering condition is met, the customer (e.g. vehicle supplier or vehicle component supplier) may specify types of vehicle information that are to be extracted, such as engine RPMs, brake pedal position, brake caliper percent engagement, steering wheel rotation, front tire position, etc. Thus, when the triggering condition is met, a software application, deployed to the vehicle from the vehicle information extraction service, may extract data for the indicated vehicle information types.

In some embodiments, an in-vehicle storage device may be used as a storage buffer to temporarily store data for some or all monitored vehicle information types. Thus, when a triggering condition is met, the software application may extract both past and current data for the vehicle information types corresponding with the triggering criteria. In this way, a vehicle extraction service may provide a customer with access to highly detailed vehicle information that is relevant to an occurrence of interest to the customer, but at the same time may refrain from using resources, such as network bandwidth, storage, etc., to stream vehicle information that is not of interest to the customer or that is not related to an occurrence of interest to the customer.

In some embodiments, the storage buffer of the vehicle may store monitored vehicle information for a limited amount of time. For example, in some embodiments a storage buffer may store vehicle information going back 5 seconds, 10 seconds, a minute, 10 minutes, etc. In some embodiments, a customer may specify a time buffer to be used to locally store different types of vehicle information. For example, the customer may specify that speed is to be buffered for 10 minutes, but engine RPMs are to be buffered for 10 seconds. Also, in some embodiments, a customer may specify a sampling rate or other statistical analysis to be performed on buffered data stored locally on the vehicle. For example, an RPM sensor may output readings at a rate of 100 readings per second, but a storage buffer may sample the sensor at a lower frequency such as 10 samples per second. As another example, a storage buffer may average the RPM readings such that an average that averages 10 samples sampled at 100 Hz is generated every 1/10 of a second and the averaged samples are saved at a rate of 10 averaged samples for second.

In some embodiments, a storage buffer may implement a time stamp process that associates a time stamp with each piece of vehicle information stored in the storage buffer. Additionally, time stamp information generated by other components of the vehicle may be stored with vehicle information generated by the other components. In some embodiments, vehicle components may issue vehicle information according to a hard-wired or otherwise known sequence. Such timing information may be included with the proprietary dictionary and may be used by a software application to apply a component specific time stamp to vehicle information stored in a storage buffer. In some embodiments, a storage buffer may re-order stored vehicle data based on time stamps such that the vehicle data is synchronized and stored in an order in which events occurred. In some embodiments, a storage buffer may store sufficient time stamp information for stored vehicle information such that a sequence of events for the stored vehicle information can be accurately recreated, for example by an analytics engine of a vehicle information extraction service. In some embodiments, vehicle information may additionally, or alternatively, be synchronized in the storage buffer according to a time stamp applied to the vehicle information when it was received at the storage buffer.

The storage buffer may drop stored vehicle information from the storage buffer that has timed out in order to make room for new vehicle information. For example, a storage buffer may be formatted such that data is dropped using a first in first out (FIFO) technique. However, different types of vehicle information may be treated differently. For example, a first type of vehicle information may be buffered for a longer period of time than another type of vehicle information, such that across different types of vehicle information FIFO may not be applied, but within a given type of vehicle information FIFO is applied.

The or more computing devices of the vehicle information extraction service are configured to, based on the proprietary dictionary, associated propriety access files, and customer indicated types of vehicle information to be monitored, generate a binary file to be provided to the vehicle. The binary file includes information for accessing and interpreting binary bits being communicated over a bus of the vehicle, such as a bit signature used to signal a beginning of a message and/or a bit signature used to signal an end of a message. The binary file may also include bit signatures used to encode "words" or "symbols" in a message for the types of vehicle information that are to be monitored, as well as scales used to signal values in a message.

The one or more computing devices of the vehicle information extraction service are also configured to provide the binary file to a vehicle for loading in a gateway or other component of the vehicle, wherein a software application implemented in the gateway or implemented in the other component is configured to use the binary file to decode vehicle information being communicated via one or more communication buses of the vehicle, wherein the vehicle information being communicated via the one or more communication buses is formatted in accordance with the encoding format of the vehicle supplier or the encoding format of the vehicle component supplier as defined in the proprietary dictionary.

Additionally, the one or more computing devices of the vehicle information extraction service are configured to receive, from the vehicle, via one or more networking devices, vehicle information packets comprising vehicle information extracted from the vehicle in accordance with the triggering criteria received from the vehicle supplier or the vehicle component supplier.

In some embodiments, a software package comprising instructions for implementing a software application that performs vehicle information monitoring and extraction is provided to a gateway or other component of a vehicle that has access to bus traffic on one or more buses of the vehicle. The instructions of the software package, when executed by one or more processors, cause the one or more processors to decode at least a portion of an amount of traffic being communicated over one or more buses of a vehicle. The bus traffic is decoded using the binary file included with the software package, wherein the binary file was generated by the vehicle information extraction service using definitions and access credentials from a proprietary dictionary of a customer (e.g. vehicle suppler or vehicle component supplier).

The instructions of the software package further cause the one or more processors to store the encoded or decoded bus traffic in a storage buffer. As explained above, different types of vehicle information may be buffered for different amounts of time. Also, it is worth noting that the instructions of the software package may also instruct other complementary types of vehicle information to be buffered, such as image data and/or audio data. In some embodiments, only a portion of the vehicle information may be decoded prior to being stored in the storage buffer. For example, a packet header for a packet communicated over a bus of the vehicle may be decoded to determine whether or not a triggering condition has been met. However, the payload of the packet may be stored in the storage buffer in an encoded format wherein associated decoded header is analyzed to determine whether or not a triggering criteria has been met. Also in some embodiments or for other types of vehicle information in the same embodiment, both the header and payload may be decoded as part of determining whether or not a triggering criteria has been met and the decoded header and decoded payload may be stored in the storage buffer.

For example, a first type of vehicle information communicated over a bus may be artificial intelligence (AI) inferences generated by an AI module of the vehicle and corresponding types of vehicle information may be images from a camera of the vehicle or audio from a microphone of the vehicle. The program instructions of the software package may instruct the software application executing in the gateway to buffer both decoded AI inferences communicated over a monitored bus and also to store corresponding images and audio. The decoded AI inferences may be stored as text data and the images and audio may be stored as digital files (e.g. comprising binary values for each pixel, etc.). The software application may store the text data, the images, and the audio in a synchronized manner such that an image file and an audio file stored for a given moment in time correspond with a text-based AI inference generated for the same moment in time. Continuing the example, a trigger for extracting AI inference data and corresponding image and audio data may be that a braking event with a deceleration greater than X G's occurred, wherein the AI inference did not signal braking was required. Such a situation may represent a human operator of a vehicle braking to avoid an obstacle not recognized by the AI system of the vehicle. Because the vehicle extraction software application synchronizes decoded AI inference text with corresponding-in-time images and/or audio, a data analytics pipeline of the cloud-based vehicle information extraction service may analyze the images and audio to determine if there was an object in the scene that was missed by the AI system of the vehicle. Such data may further be used to train the AI model to identify such obstacles in the future. Note the synchronization may take into account a delay between the images/audio and a time when an AI component of the vehicle issues an AI inference. For example, the AI inference may lag the audio/video. However, the software application and/or storage buffer may account for this lag when synchronizing images, audio, and an AI inference all corresponding to a same event or occurrence.

In some embodiments, a software package may include instructions for implementing anonymization of any personal or sensitive data that is provided to a gateway or other component of a vehicle that has access to bus traffic on one or more buses of the vehicle. For example, the vehicle camera may capture license plate numbers from other vehicles that may need to be obfuscated before uploading to the server in accordance with various local regulations.

As mentioned in the above example, the instructions included with the software package provided to the vehicle from the vehicle information extraction service, when executed by one or more processors, causes one or more packets of extracted vehicle information to be generated for sending to the vehicle information service when the triggering criteria are met.

In some embodiments, a vehicle information extraction service implemented in a cloud-service provider network may include pre-configured analytics capabilities to process extracted vehicle information and gain insights about vehicle health. The vehicle information extraction service may also include a visual interface to help diagnose and troubleshoot potential issues with the vehicle. With near real-time insights, customers (e.g. vehicle supplier and/or vehicle components suppliers) may quickly repair vehicle problems and warranty claims and proactively detect and mitigate widespread quality issues using such a vehicle information extraction service. This may allow vehicle suppliers and/or vehicle component suppliers to reduce vehicle service costs and improve the customer experience.

In some embodiments, a vehicle information extraction service may provide a fully managed service to remotely collect, store, organize, and monitor data from millions of vehicles, with no custom development needed from customers such as vehicle suppliers and/or vehicle component suppliers.

In some embodiments, customers (e.g. vehicle suppliers and/or vehicle component suppliers) may modify types of vehicle information to be monitored and/or triggering criteria for extracting vehicle information. Such modifications may be made using an application programmatic interface (API) to the vehicle information extraction service, wherein the vehicle information extraction service automatically generates updated configuration files to accommodate the requested modifications and automatically deploys the updated configuration files to the vehicle(s) being monitored in order to implement the requested modifications.

In some embodiments, customers (e.g. vehicle suppliers and/or vehicle component suppliers) may further define alarms, via an API to the vehicle information extraction service, wherein the alarms specify conditions under which the customer is to be notified. Note that the alarm conditions and the triggering conditions for data extraction may be similar or different. For example, data may be extracted according to lower thresholds, whereas the customer may set alarm notifications at higher thresholds.

In some embodiments, different triggering conditions may be set for different data sets. Also, in some embodiments, trigger conditions may be linked or layered, such that one trigger condition being met is a condition precedent for a subsequent triggering condition. For example triggering conditions may be logically joined using an "AND", "OR", or "ANY" logical operator in a trigger condition definition. In some embodiments, triggers may be ordered in time, such that a first triggering condition is evaluated prior to a subsequent triggering condition.

Additionally, in some embodiments, customers (e.g. vehicle suppliers and/or vehicle component suppliers) may view aggregated data extracted from a vehicle fleet. For example, such information may be used to detect widespread quality issues, such as faulty airbag sensors, and then provide information to a customer's manufacturing group for corrective action.

In some embodiments, the vehicle information communicated over a bus of a vehicle may be formatted in binary form. In some embodiments, the binary files used to decode the binary information may be used to convert the binary data into standardized formats, such as JSON/XML formats that can be used with downstream applications.

In some embodiments, a software application that performs vehicle information monitoring and extraction may send the generated packets using HTTP/1.1 (or MQTT and IoT Core or ISO TC204) to upload data to the cloud service provider network with a certain retransmission threshold. For binary car streaming data (camera, radar, LIDAR), the software application may use webRTC that allows a customer's engineer to interact with the in-vehicle binary streaming sensors (e.g. turn on camera live view) connecting to a cloud streaming service, etc.

In some embodiments, the packets may be sent over a wireless network such as a cellular network, Wi-Fi network, a long range wide area network (LoRaWAN), or network offered by the service provider. The automaker may use the console to remotely configure what type of packets can be uploaded from the vehicle to the cloud service provider over each communication protocol and for how long such packets are stored at the vehicle and/or the cloud service provider before they are overwritten. For example, an automaker can choose to store vehicle camera data for the past day and upload only over Wi-Fi. In another example, an automaker can choose to receive vehicle troubleshooting codes as soon as they occur, over a LoRaWAN network.

In some embodiments, a vehicle information extraction service may support various vehicle diagnostic standards, such as the Unified Diagnostic Service (UDS) ISO 14229 standard, the Diagnostics over IP (DoIP) ISO 13400 standard, the Open Diagnostics eXchange (ODX) ISO 22901 standard, the Open Test sequence eXchange format (OTX) ISO 13209, the Modular Vehicle Communication Interface (MVCI) ISO 22900.

FIG. 1 illustrates a vehicle information extraction service that receives dictionaries with proprietary encoding formats used by a vehicle supplier or component part suppliers to format vehicle information communicated over a vehicle bus, wherein the vehicle information extraction service maintains confidentiality of the proprietary encoding formats while deploying software packages to vehicles to monitor vehicle information encoded using the proprietary encoding formats for extraction if one or more triggering conditions are met, according to some embodiments.

System 100 includes vehicle information service 102 and network 124 that is connected to vehicles 126, 142, and 144. In some embodiments, network 124 may be connected to any number of vehicles. Also customers 122a through 122n are connected to vehicle information service via network 116. In some embodiments, customers 122a through 122n may be vehicle suppliers or vehicle component suppliers (e.g. vehicle original equipment manufacturers (OEMs) and/ or tier-1, tier-2, or tier-3 parts suppliers). Network 116 may be a private or public network such as a direct connect connection to a service provider network hosting the vehicle information extraction service 102, or an Internet connection. Network 124, may be a wireless network, such as a cellular network, Wi-Fi network or other wireless network.

Vehicle information extraction service 102 includes service user interface 104, restricted access vehicle dictionary and credential storage 106, binary file generation module 108, vehicle communication interface 110, extracted vehicle information collection module 112, and extracted data analysis and/or visualization module 114.

Figure 2:
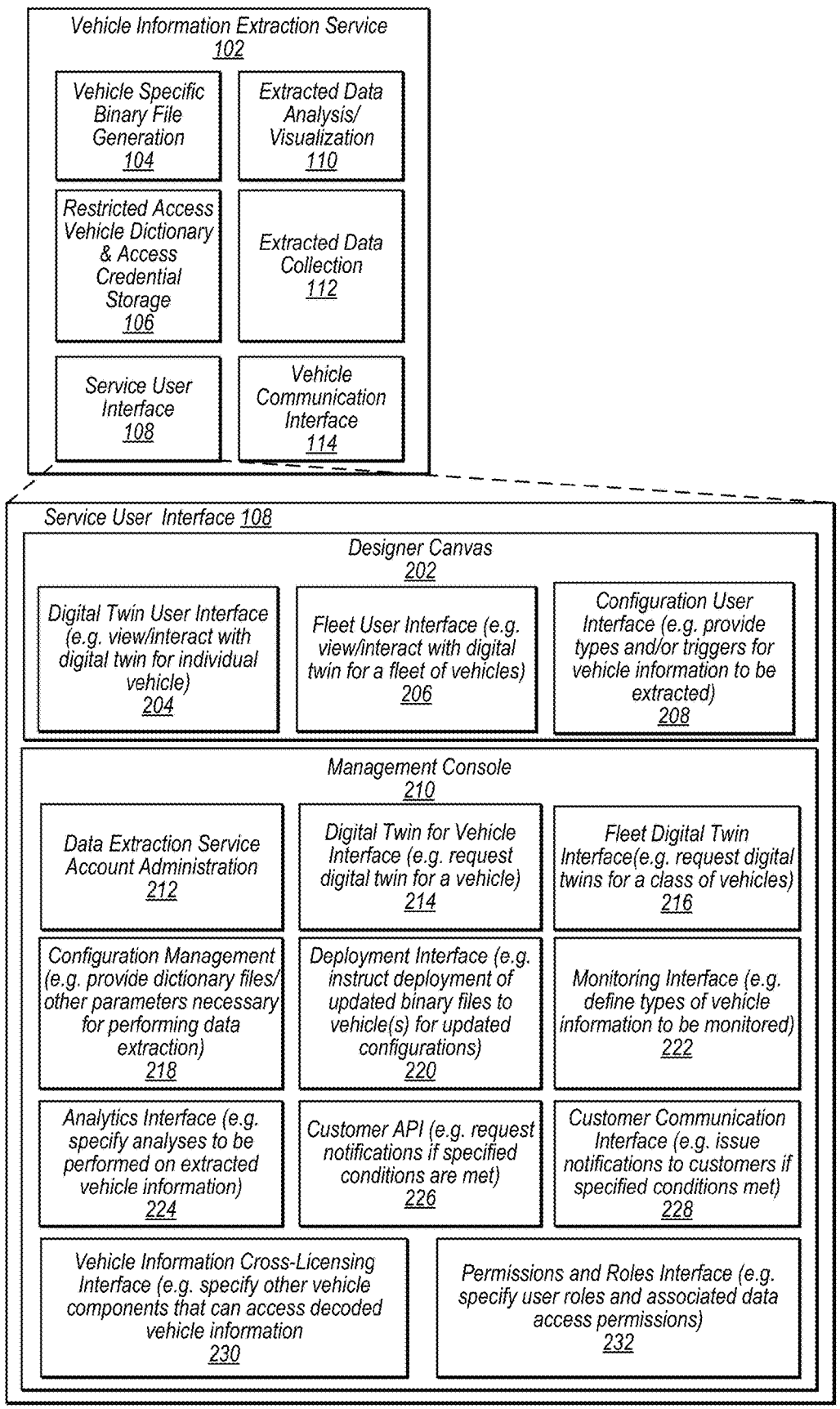
FIG. 2 illustrates a more detailed view of a designer canvas and management console of a service user interface for the vehicle information extraction service, according to some embodiments.

In some embodiments, service user interface 104 may include a designer canvas and a management console as further discussed in FIG. 2. In some embodiments, customers may provide a dictionary file describing proprietary protocols and encoding formats used to communicate vehicle information over a bus from components designed by the customer (e.g. vehicle supplier and/or vehicle component supplier) and/or an associated proprietary access credential file. For example, customer 122a provides submission 118 comprising a vehicle supplier dictionary file of customer 122a and also indicating extraction criteria for vehicle information formatted according to the vehicle supplier dictionary. Additionally, customer 122n provides submission 120 comprising a component supplier dictionary file and also indicating extraction criteria for vehicle information formatted according to the component supplier dictionary. Note that the dictionary file and extraction criteria are shown in FIG. 1 as being part of a same submission. However, in some embodiments, the extraction criteria and the dictionary file may be submitted separately.

The dictionary files and associated access credential files received from the customers 122a and 122n may be stored in restricted access dictionary and credential storage 106. The dictionary file and associated access credential file of customer 122a and the dictionary file and associated access credential file of customer 122n may each be stored in a separate physical or logical container that has restricted access. For example, customer 122n is not able to view customer 122a's dictionary file and access credential file and vice-versa.

Binary file generation module 108 may identify dictionary definitions and associated access credentials for particular types of vehicle information that are to be extracted based on the extraction criteria indicated in submissions 118 and 120. Furthermore, the binary file generation module may generate binary files instructing a software application of a vehicle how to access and decode binary information communicated over a vehicle bus that corresponds with the type of vehicle information indicated in the extraction criteria of submissions 118 and 120. Furthermore, the binary file generation module 108 may include extraction criteria in the binary files indicating when the relevant types of vehicle information are to be extracted and included in packets sent back to the vehicle information service 102 or to the customers 122a and 122n. In some embodiments, the types of vehicle information to be monitored and/or the triggering criteria may be included in a configuration file that is sent along with the binary file in a software package, such as software package 146.

The binary file, source code, and/or configuration file may be included in software package 146 that is sent to in-vehicle computing device 150. In some embodiments, in-vehicle computing device 150 may implement a gateway for vehicle 126 or may otherwise be a component of vehicle 126 that has access to data transmitted over one or more buses of the vehicle, such as encoded vehicle communications bus 138. In some embodiments, a bus of a vehicle, such as encoded vehicle communications bus 138, may transmit multicast vehicle information sent from multiple components of a vehicle, such as electronic control unit 128 (ECU #1) and electronic control unit 130 (ECU #2). Additionally, other components, such as physical sensor 136 and audio/visual sensors 132, may communicate vehicle information over encoded vehicle communications bus 138.

Software package 146 may be used to implement software application 152 executing on the in-vehicle computing device 150. In some embodiments, software application 152 may access binary files storage 154 to access and decode vehicle information transmitted over encoded vehicle communications bus 138. For example, bus traffic decoding and triggering module 156 may use binary files/and or configuration files in binary file storage 154 to access and decode bus traffic. The bus traffic decoding and trigger monitoring module 156 may further cause vehicle information, such as the decoded bus traffic and/or other vehicle information such as visual or audio data to be stored in the storage buffer 158. As explained in more detail in FIG. 5, the storage buffer may store encoded and/or decoded vehicle information and other associated vehicle data for a plurality of preceding moments in time in the past. Furthermore, bus traffic decoding and trigger monitoring module 152 may compare the decoded bus traffic to one or more triggering criteria for data extraction to determine whether or not the triggering criteria has been met. If the triggering criteria are met, packet generation module 180 may generate one or more packets to be sent back to vehicle information extraction service 102 as extracted vehicle information 148.

In some embodiments, vehicle information extraction service 102 includes vehicle communication interface 110 configured to establish a secure connection with respective vehicles, such as vehicle 126 to send software package 146 and to receive extracted vehicle information 148.

In some embodiments, extracted vehicle information collection module 112 may cause the extracted vehicle information 148 to be stored in a storage account of the customer, such as a storage account of a storage service provided by a provider network that also implements the vehicle information extraction service 102.

In some embodiments, the vehicle information extraction service may further orchestrate analysis and/or visualization to be performed on the extracted vehicle information 148. For example, the extracted vehicle information may be compared to alarm triggers for alarms that cause the customer to be notified. Also, the extracted vehicle information may be organized into visual graphics, such as charts, graphs, or other user interface tools for presentment to the customer. In some embodiments, the extracted vehicle information may be used to train an artificial intelligence (AI) model or may be provided to a machine learning tool to optimize settings of the vehicle.

FIG. 2 illustrates a more detailed view of a designer canvas and management console of a service user interface for the vehicle information extraction service, according to some embodiments.

In some embodiments, a service user interface of a vehicle information extraction service, such as service user interface 108, may include a designer canvas, such as designer canvas 202, and a management console, such as management console 210. In some embodiments, a designer canvas may enable a customer engineer, such as an engineer of a vehicle supplier or vehicle component supplier to view digital twins comprising data extracted from real-world vehicles. The designer canvas may also enable the engineers to modify types of data monitored/extracted and/or triggering criteria for extracting data. In some embodiments, the designer canvas may enable customer engineers to log into a web application using their own corporation credentials (e.g. the credentials issued to the engineers from the corporate customer) without requiring each engineer to have an account or credential with the vehicle information extraction service. Using the web application, the customer's engineers may be able to access, visualize, and monitor vehicle data. The designer canvas may also enable the customer to build custom reporting or analytics, or to incorporate vehicle data into their existing software environments. In some embodiments, the web applications offered by the vehicle information extraction service may be pre-configured or easily configurable without requiring the customer to generate code for the web-applications.

In some embodiments, a management console for a vehicle information extraction service may provide additional features and may further enable the customer to manage the customer's account with the vehicle information extraction service, such as providing access to proprietary dictionaries, creating additional digital twins, etc.

In some embodiments, a designer canvas, such as designer canvas 202, includes a digital twin user interface 204, a fleet user interface 206, and a configuration user interface 208. The digital twin user interface 204 may enable an engineer of the customer to view and interact with a digital twin for a given real-world vehicle, wherein the digital twin comprises near-real time vehicle information extracted from the real-world vehicle. The fleet user interface 206 may enable an engineer of the customer to view and interface with a digital twin representing a class (or fleet) of vehicles. The fleet digital twin may include aggregated data representing near real-time states of a class of vehicles matching a fleet definition for the fleet. Additionally, digital twin user interface 204 and fleet user interface 206 may enable an engineer of the customer to view and interact with historical data extracted from the real-world vehicle or the fleet of real-world vehicles. In some embodiments, a digital twin may be created for a vehicle using designer canvas 202 prior to the real-world vehicle being built.

In some embodiments, designer canvas 202 may include a configuration user interface, such as configuration user interface 208. Configuration user interface 208 may enable an engineer of the customer to provide/modify types of vehicle information that are to be extracted from a vehicle or fleet of vehicles as well as triggering criteria for extracting the vehicle information. For example, if troubleshooting a given system, the engineer may modify data extraction to include additional types of vehicle information to be extracted such as from sub-components of the system being troubleshot.

Management console 210 includes data extraction service account administration 212, which may be used to manage the customer's account, such as billing, contact information, etc. Additionally, management console 210 includes digital twin for vehicle interface 214 and fleet digital twin interface 216. These interfaces may be used by the customer to authorize additional digital twins be created for either an individual vehicle or a fleet of vehicles. In some embodiments, a prompt in the designer canvas 202 may cause a request to be queued for approval by the customer, wherein the approval causes digital twin interface 214 or fleet digital twin interface 216 to create additional digital twins.

Management console 210 includes configuration management interface 218 that enables the customer to link or upload a proprietary dictionary. In some embodiments, a request to link or upload a proprietary dictionary may be submitted from the designer canvas 202 and when approved by the customer may cause configuration management console 218 to perform the uploading or linking of the proprietary dictionary. Deployment interface 220 of management console 210 may then cause generated binary files to be deployed to vehicles that are to be monitored. In some embodiments, a management console, such as management console 210, may further include a monitoring interface 222 for receiving and viewing extracted vehicle information. In some embodiments, the monitoring interface may also enable specification of monitoring parameters such as alarms to be triggered if certain thresholds are met in the extracted vehicle information. In some embodiments, the binary files may be generated by the vehicle information extraction service 102 and provided to the customer for deployment into the customer's vehicles.

Management console 210 also includes analytics interface 224 for defining analysis to be performed on extracted vehicle information and includes customer API interface 226 that enables customers to specify analysis, alarms, notification parameters, etc. Additionally, management console 210 includes customer communications interface 228 configured to issue notifications to the customer if certain alarm thresholds are met in the extracted vehicle information.

In some embodiments, service user interface 108 further includes vehicle information cross-licensing interface 230 which may be used by a customer to select other components of the vehicle with which the decoded vehicle information is to be shared. For example a vehicle OEM may license a tier-1 supplier to have access to decoded vehicle information from a sensor that communicates using a proprietary protocol of the OEM. By licensing the sharing of the decoded vehicle information, the OEM may enable the tier-1 supplier component to use the decoded vehicle information, but may not be required to share the proprietary dictionary with the tier-1 supplier. Instead the proprietary dictionary is stored in the restricted access vehicle dictionary storage 106 of the vehicle data extraction service 102 and is not accessible by the tier-1 supplier. However, even though the proprietary dictionary remains restricted from viewing by the tier-1 supplier, this does not prevent interoperability of components of the OEM and the tier-1 supplier.

In some embodiments, management console 210 further includes permissions and roles interface 232, which may enable a customer to define access roles for different types or classes of users (which may be employees of the vehicle supplier or vehicle component supplier that are the customer of the vehicle information extraction service). For example, some users may be assigned roles that only permit the use of pre-configured vehicle information extraction configurations, while other users may be provided roles that enable development of new vehicle information extraction configurations, such as to more deeply delve into operations of particular components of a vehicle.

Figure 3:
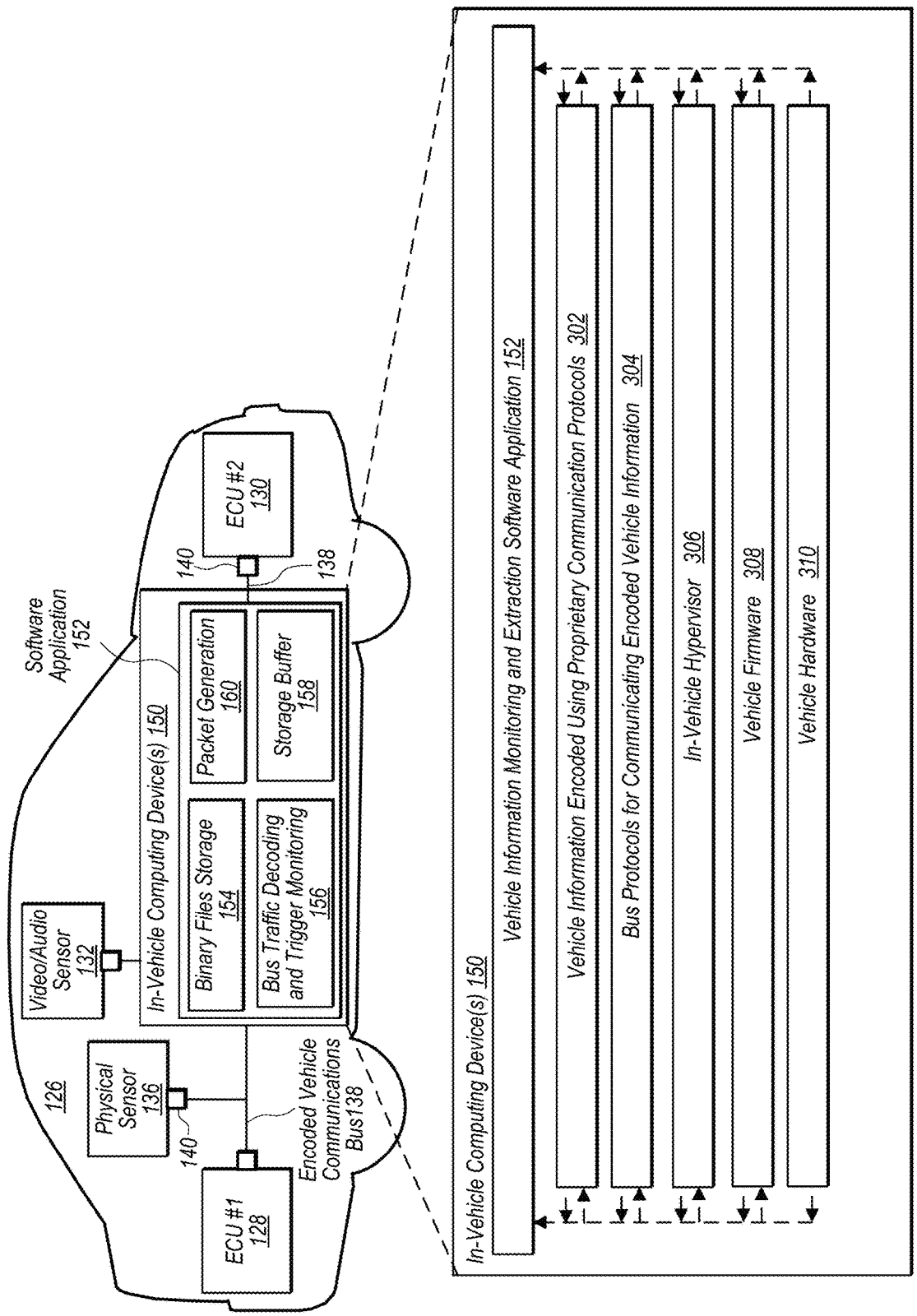
FIG. 3 illustrates a more detailed view of a network stack of protocols used at different levels to communicate vehicle information over a bus of a vehicle and access credentials needed at the different levels to access such vehicle information, according to some embodiments.

FIG. 3 illustrates a more detailed view of a network stack of protocols used at different levels to communicate vehicle information over a bus of a vehicle, according to some embodiments.

In some embodiments, the binary files stored in binary files storage 154 may include propriety access credentials and protocol definitions for multiple layers of a network stack of the vehicle that enable access to, and decoding of, the communications transmitted over the communication bus of the vehicle. For example, binary files included in binary file storage 154 may indicate access credentials, protocols, and/or addresses used at vehicle hardware layer 310. Additionally, the binary files may indicate access credentials, protocols, or ports used at a vehicle firmware layer 308 and/or at an in-vehicle hypervisor layer 306. Additionally, the binary files may indicate bus protocols used at a bus layer 304 and proprietary protocols and access credentials of the customer used at layer 302. Vehicle information monitoring and extraction software application 152 may use these definitions and access credentials included in the binary files to access and decode messages sent over encoded vehicle communications bus 138, as an example.

Figure 4:
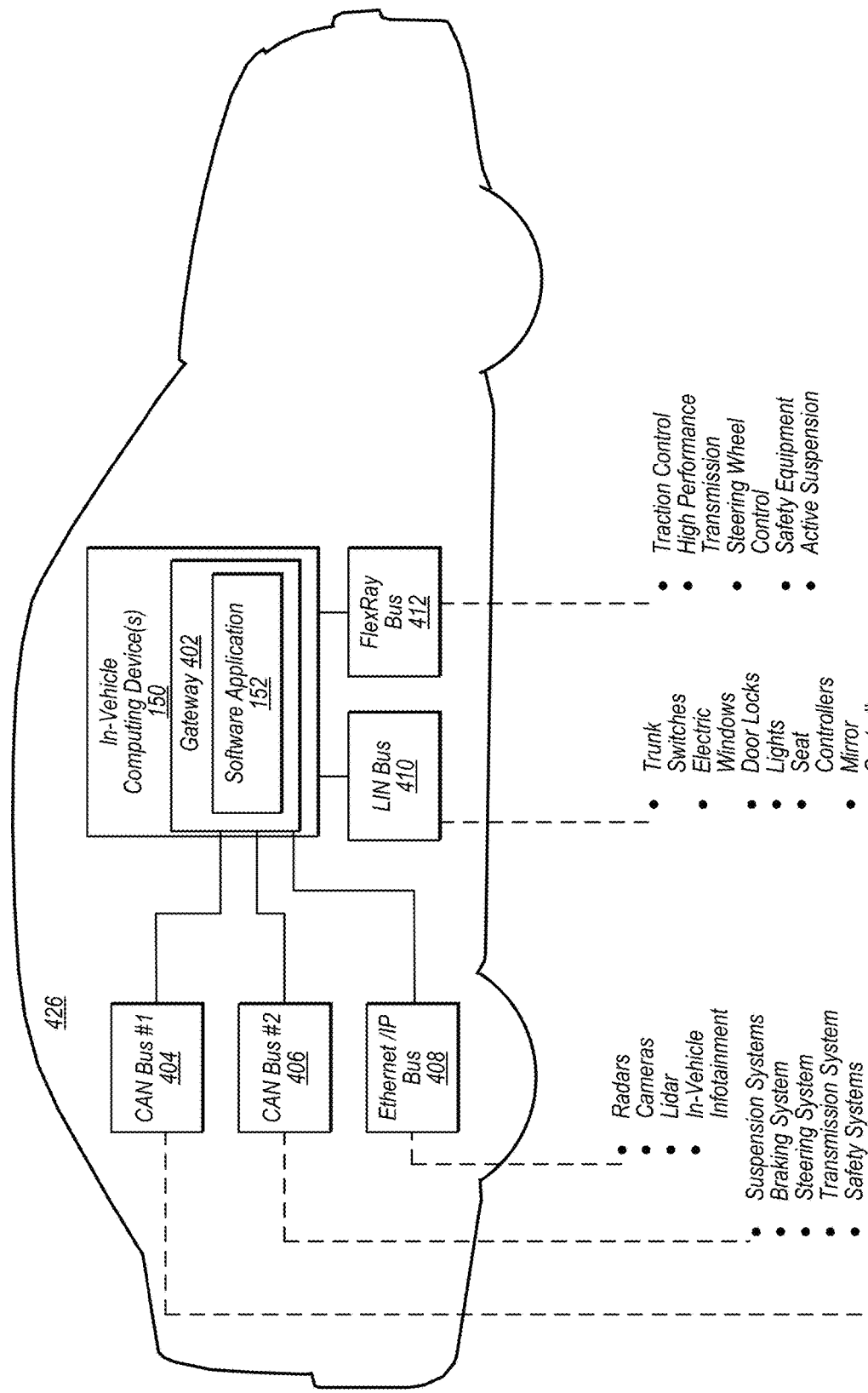
FIG. 4 illustrates an example vehicle comprising multiple different buses that may be monitored for data extraction by a software application deployed by a vehicle information extraction service, according to some embodiments.

FIG. 4 illustrates an example vehicle comprising multiple different buses that may be monitored for data extraction by a software application deployed by a vehicle information extraction service, according to some embodiments.

In some embodiments, a vehicle, such as vehicle 426, may include multiple buses connected to a gateway. For example, vehicle 426 includes gateway 402 that is connected to CAN bus #1 (404), CAN bus #2 (406), Ethernet/IP bus 408, local interconnect (LIN) bus 410, and FlexRay bus 412. As shown in FIG. 4, different types of vehicle information may be transmitted over the different types of buses. In some embodiments, a customer may supply access to a proprietary dictionary for only some or all buses of a vehicles. Also the customer may specify only some or all of the buses of the vehicle are to be monitored. Additionally, the customer may specify only certain components connected to a given bus are to be monitored.

Figure 5:
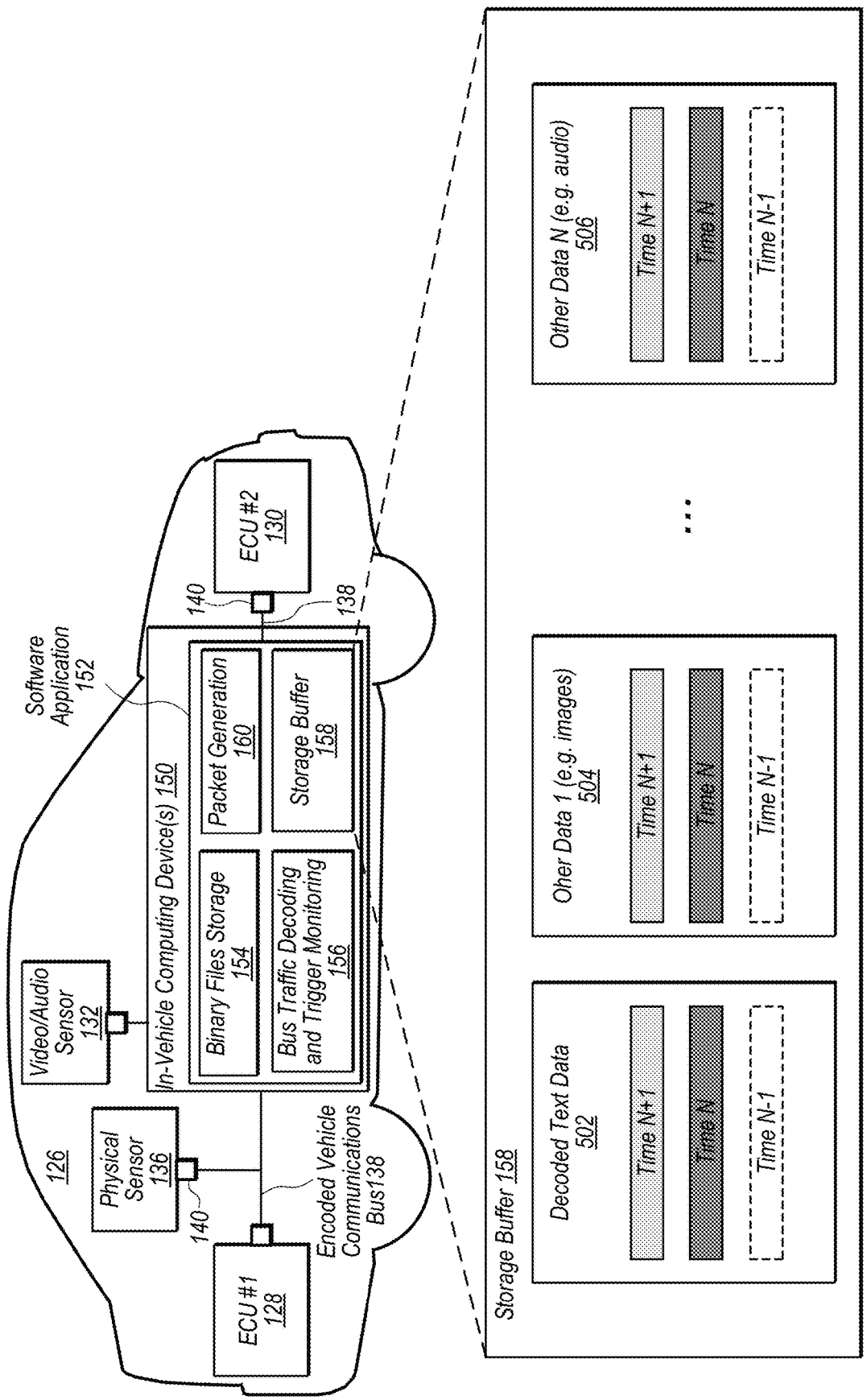
FIG. 5 illustrates a more detailed view of a storage buffer that may be used by an application deployed by a vehicle information extraction service, wherein the storage buffer stores data from one or more preceding moments in time that is eligible for extraction if one or more triggering criteria are met, according to some embodiments.

FIG. 5 illustrates a more detailed view of a storage buffer that may be used by an application deployed by a vehicle information extraction service, wherein the storage buffer stores data from one or more preceding moments in time that is eligible for extraction if one or more triggering criteria are met, according to some embodiments.

As shown in FIG. 5, in some embodiments, a storage buffer 158 may store more than one type of data in more than one buffer. For example, storage buffer 158 includes time-synchronized decoded text buffer 502, other data buffer 1 (504) and other data buffer N (506). Current data may be stored at time N. Data for a next moment in time will be stored at time N−1, which when the next moment in time arrives will then become time N and the data previously stored at time N, will become time N+1. In some embodiments, a storage buffer 158 may store data for any number of moments of time (e.g. N+X, where X is a number of moments in time that are buffered). Also in some embodiments, X may be different for different types of vehicle information, such that some types of vehicle information are buffered for longer periods of times than other types of vehicle information.

In some embodiments, a global time stamp may be applied to the vehicle information when stored in the storage buffer 502. Also, in some embodiments the payload of data stored in storage buffer 502 may include time stamps associated with the stored data that were generated by other components of the vehicle, such as a time stamp of when a message comprising the data was submitted to the encoded vehicle communications bus 138, or a time when the data was sensed, such as by physical sensor 136. Thus, in some embodiments, a piece of data may have more than one time stamp associated with it, such as a payload time stamp for when the data was sensed, for example at physical sensor 136, another payload time stamp for when the data was submitted to encoded vehicle communications bus 138, and another time stamp for when the data was received at storage buffer 158. In some embodiments, a piece of data stored in storage buffer 158 may be stored with more or fewer time stamps. Such time stamps may enable an accurate representation of a sequence of events in the vehicle to be recreated, for example by the software application 152, or by an extracted data analysis and visualization module 114 of a vehicle information extraction service 102.

Figure 6:
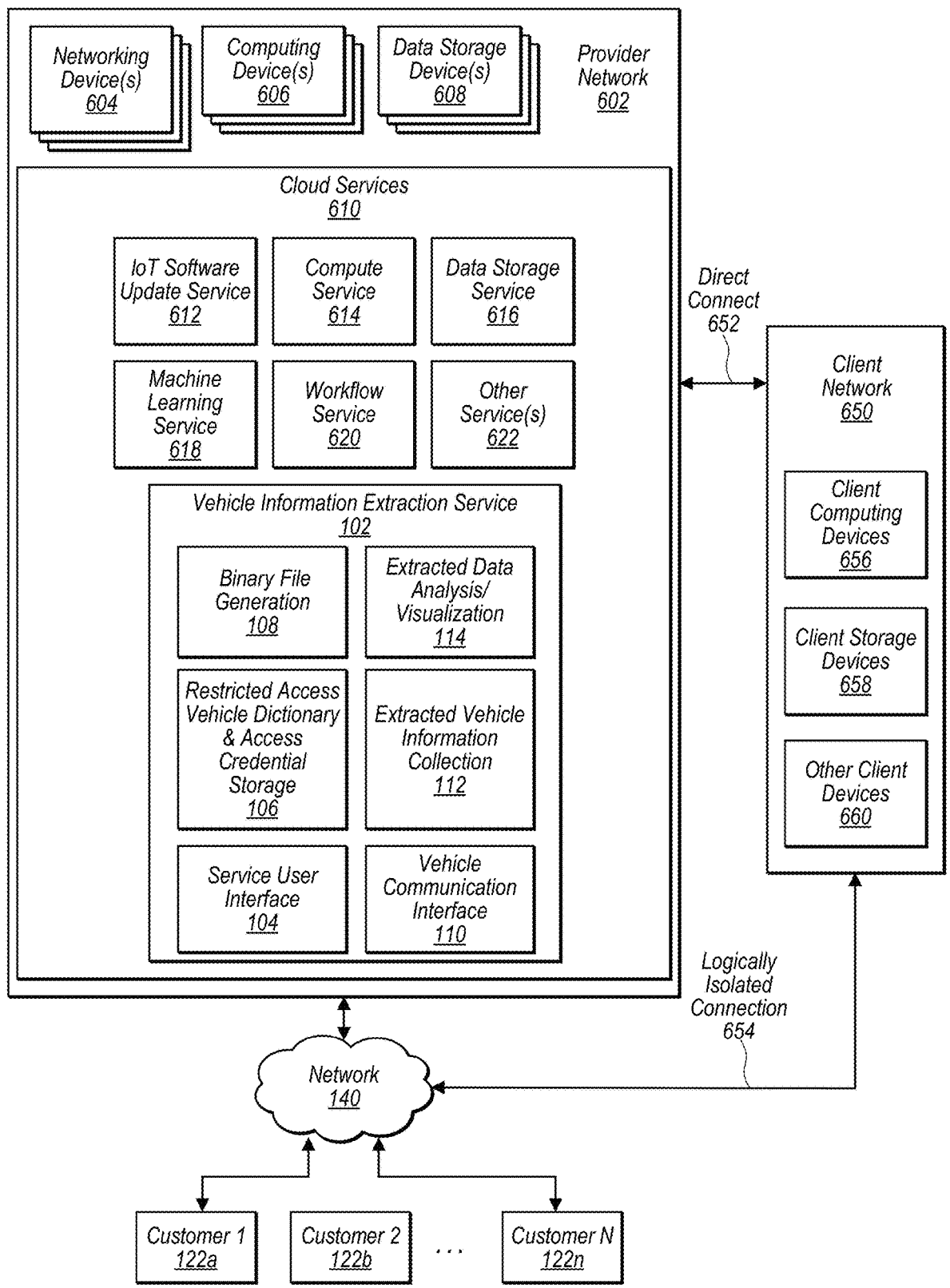
FIG. 6 illustrates an example provider network that includes a vehicle information extraction service as well as other cloud services offered by the provider network, according to some embodiments.

FIG. 6 illustrates an example provider network that includes a vehicle information extraction service as well as other cloud services offered by the provider network, according to some embodiments.

In some embodiments, a provider network, such as provider network 602, includes networking devices 604, computing devices 606, and data storage devices 608 that implement cloud services 610. In some embodiments, a provider network may implement a plurality of cloud services in addition to a vehicle information extraction service. For example, provider network 602 implements cloud services 610 that include IoT software update service 612, compute service 614, data storage service 616, machine learning service 618, workflow service 620, and other services 622. Cloud services 610 also includes vehicle information extraction service 102.

In some embodiments, an IoT software update service, such as IoT software update service 612, may facilitate software updates on devices connected to the IoT software update service, such as vehicles 126, 142, and 144 as illustrated in FIG. 1. In some embodiments, an IoT software update service may additionally update firmware on a connected device and may utilize encrypted communications to perform the update. In some embodiments, the IoT software update service may also include identity authentication protocols to prevent unauthorized entities from altering software on a connected device, such as a vehicle, and encrypt communications to the connected device to prevent alterations to the software updates.

In some embodiments, a compute service, such as compute service 614, may include computing devices that implement virtual compute machines that may be used to analyze collected vehicle information and/or may be used to implement a vehicle information extraction service.

In some embodiments, a data storage service, such as data storage service 616, may include data storage devices that implement a virtualized data storage, such as virtual data storage volume or virtual storage containers for an object-based storage. In some embodiments, a data storage service, such as data storage service 616, may be used to store collected vehicle information for a customer. Also, in some embodiments, a data storage service, such as data storage service 616, may be used to implement components of a vehicle information extraction service, such as a restricted access storage for a proprietary dictionary.

In some embodiments, a machine learning service may execute one or more machine learning algorithms to determine relationships in vehicle information extracted via a vehicle information extraction service, for example to optimize a workflow service, or to optimize another service. For example, in some embodiments, a machine learning service, such as machine learning service 618, may be used to optimize parts distribution management based on vehicle information collected by a vehicle information extraction service. In some embodiments, a machine learning service of a provider network that also provides a vehicle information extraction service may further analyze extracted vehicle information and/or other information related to a given vehicle or class of vehicles to generate recommendations regarding types of vehicle information to be monitored and/or triggering criteria for extraction of vehicle information.

In some embodiments, a workflow service, such as workflow service 620, may execute a workflow based on input data and a stored or developed workflow. For example, in some embodiments, a workflow service, such as workflow service 620, may determine actions to be taken based on collected vehicle information. As an example, a workflow service may determine a filter, hose, or fluid needs to be changed or replaced based on applying collected vehicle information to one or more stored or developed work flows. In some embodiments, a machine learning service, such as machine learning service 618, may be used to develop or improve work flows executed by workflow service 620. In some embodiments, workflow service 620 may use extracted vehicle information to initiate shipping of vehicle parts that are likely to be needed at a particular location in the future based on extracted vehicle information.

In some embodiments, cloud services 610 may include various other cloud services, such as other services 622.

In some embodiments, a vehicle information extraction service may be configured to establish a secure connection to a customer network for delivering data from extracted from a vehicle or fleet of vehicles. For example, in some embodiments, a customer (e.g. vehicle supplier or vehicle component supplier) may receive certain types of vehicle data for use in improving vehicle design and/or for use in managing parts inventory. In some embodiments, a customer network, such an OEM network may establish a secure connection to a vehicle information extraction service via a direct connection, such as direct connect 652, or via a logically isolated network connection, such as logically isolated network connection 654. In some embodiments, a direct connection may include a dedicated physical network link that links the customer network 650 to the provider network 610 and/or one or more logically isolated network connections within provider network 610 that route traffic from a router physically connected to the customer network 650 via direct connect 652 to computing devices and/or storage devices that implement the vehicle information extraction service 102. For example, a data lake may be implemented using cloud services, such as compute service 614 and data storage service 616, or may be implemented directly by a customer using customer resources, such as customer computing devices 656, customer storage devices 658, or other customer devices 660.

FIGS. 7A-7F illustrate example user interface pages that are used to define and enable data extraction from a vehicle or fleet of vehicles, according to some embodiments.

Figure 7A:
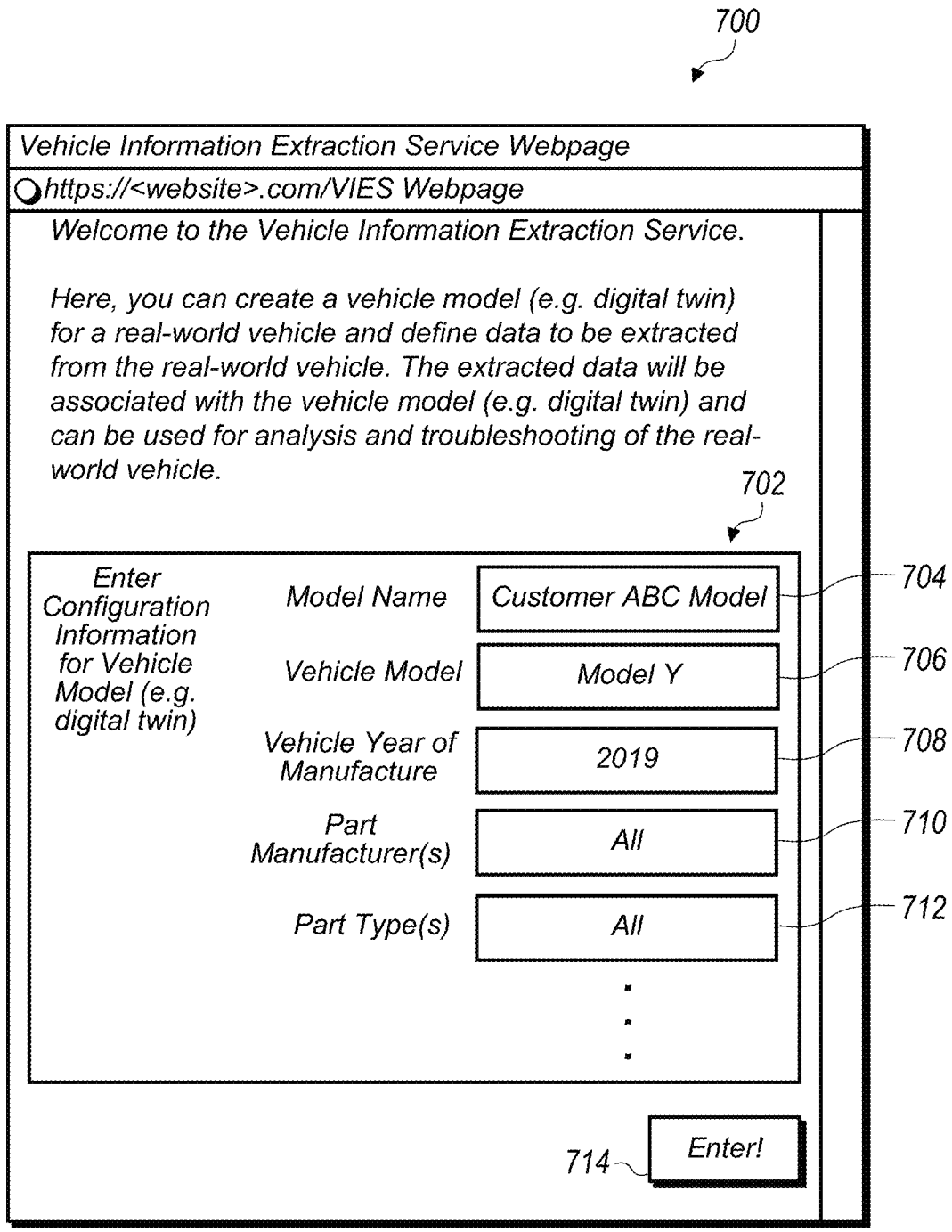

In FIG. 7A a customer may utilize designer canvas 700 to enter configuration information for a vehicle model that is to be created (e.g. a digital twin). In box 702, the customer may specify a model name (704), a vehicle model of the real-world vehicle (706), a model year of the real-world vehicle (708), a part manufacturer (710) if only parts of a certain manufacturer are to be monitored. Also at 712 the customer may further specify part types that are to be monitored. At 714 the customer may select enter to create the vehicle model.

In FIG. 7B, the customer may provide identifying information for the real-world vehicle that is to be paired with the digital twin vehicle model created in FIG. 7A. For example, in box 722, the customer may specify a unique vehicle indenter (724), VIN number (726), a license plate number (728), an owner's name (730), an owner's email (732), a country or langue of the owner (734), and at 736 the customer may select enter to complete the definition of the real-world vehicle to be paired with the digital twin vehicle model. In some embodiments, the customer may only be required to provide a unique vehicle identifier and other fields may be auto populated. For example, a manufacturing inventory management system may automatically populate the VIN number (726). As another example, a dealer or delivery management system may automatically populate the license plate (728), owner's name (730), owner's email (732), country/language (734), etc. In some embodiments, more or fewer fields may be used to provide identifying information for a real-world vehicle.

In FIG. 7C, the customer may specify a gateway (or other component) of the real-world vehicle where the in-vehicle monitoring and data extraction software is to be deployed. For example, in box 742, the customer may specify a name for the deployment component (744), a proxy server for communicating with the deployment component (746), an operating system or runt-time environment configuration for the deployment component (748), a network interface for the software package to communicate with the deployment component (750), and an install directory of the deployment component at which the software packaged is to be installed (752). At 754, the customer may select enter to submit the deployment component definition and configuration.

Figure 7D:
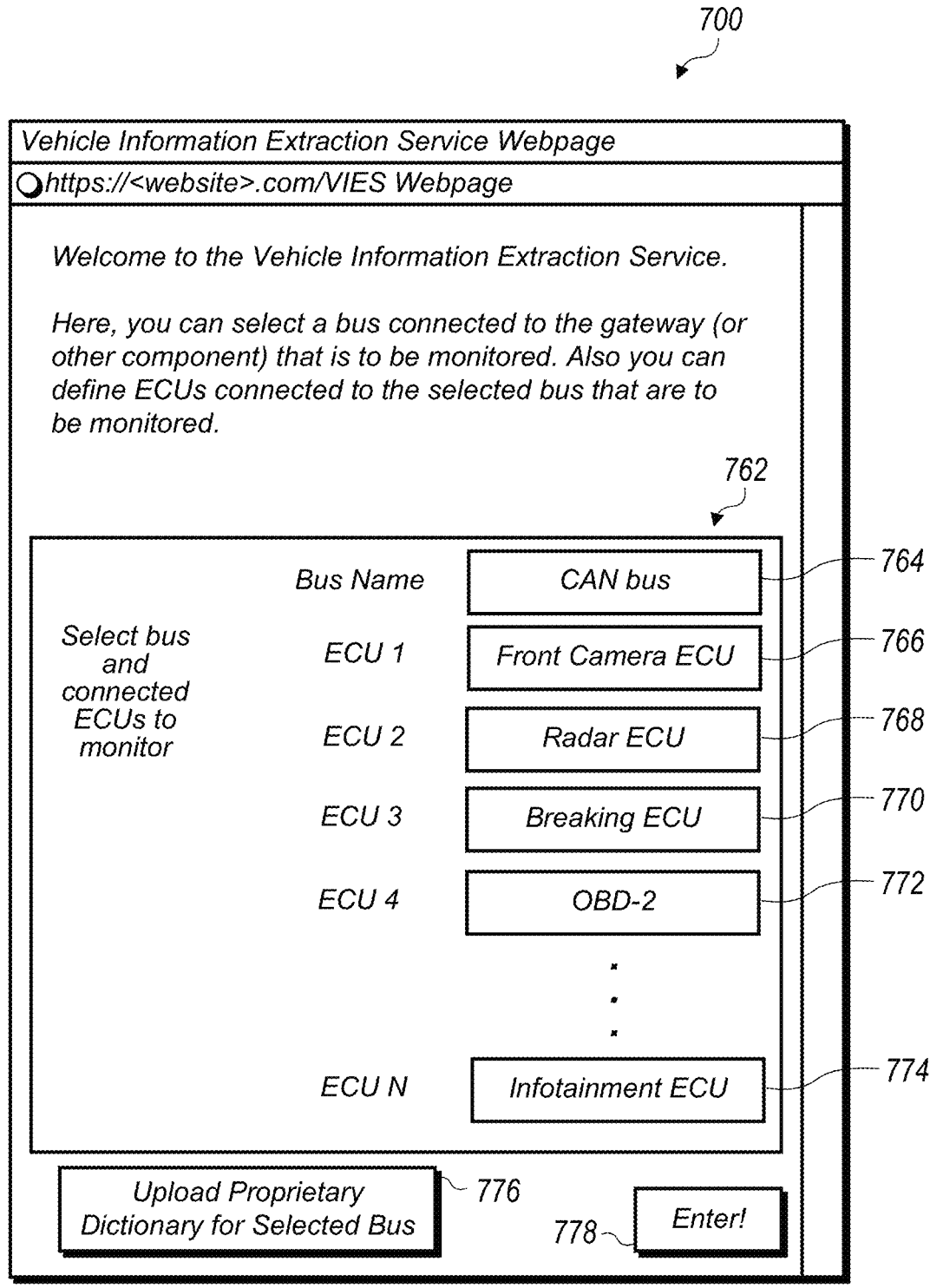

In FIG. 7D, the customer may select a bus and components connected to the bus that are to be monitored. For example in box 762, the customer may specify a bus name at 764 and may select components connected to the selected bus at 766-774. Button 776 may be used to upload or otherwise provide access to a proprietary dictionary for the selected bus. In some embodiments, the components connected to the bus may be pre-populated for selection based on information included in the proprietary dictionary uploaded via button 776. Note that in some embodiments, more than one bus may be selected for monitoring. Thus, a similar page as shown in FIG. 7D may be used for the additional busses. At 778, the customer may submit the selected bus monitoring configuration.

In some embodiments, additional user interface pages may be provided between those shown in FIGS. 7B and 7C to allow the customer to define the components of the vehicle, such as what buses are included in the vehicle, what ECUs are connected to those buses, what sensors are connected to the ECUs, etc. In some embodiments, this information may be prepopulated based on the contents of the uploaded proprietary dictionary and/or other information about a particular make and/or model of vehicle that is stored by the vehicle information extraction service. Also, in some embodiments, a customer may be enabled to add to, or modify, a pre-populated inventory available buses, ECUs, sensors, etc.

Figure 7E:
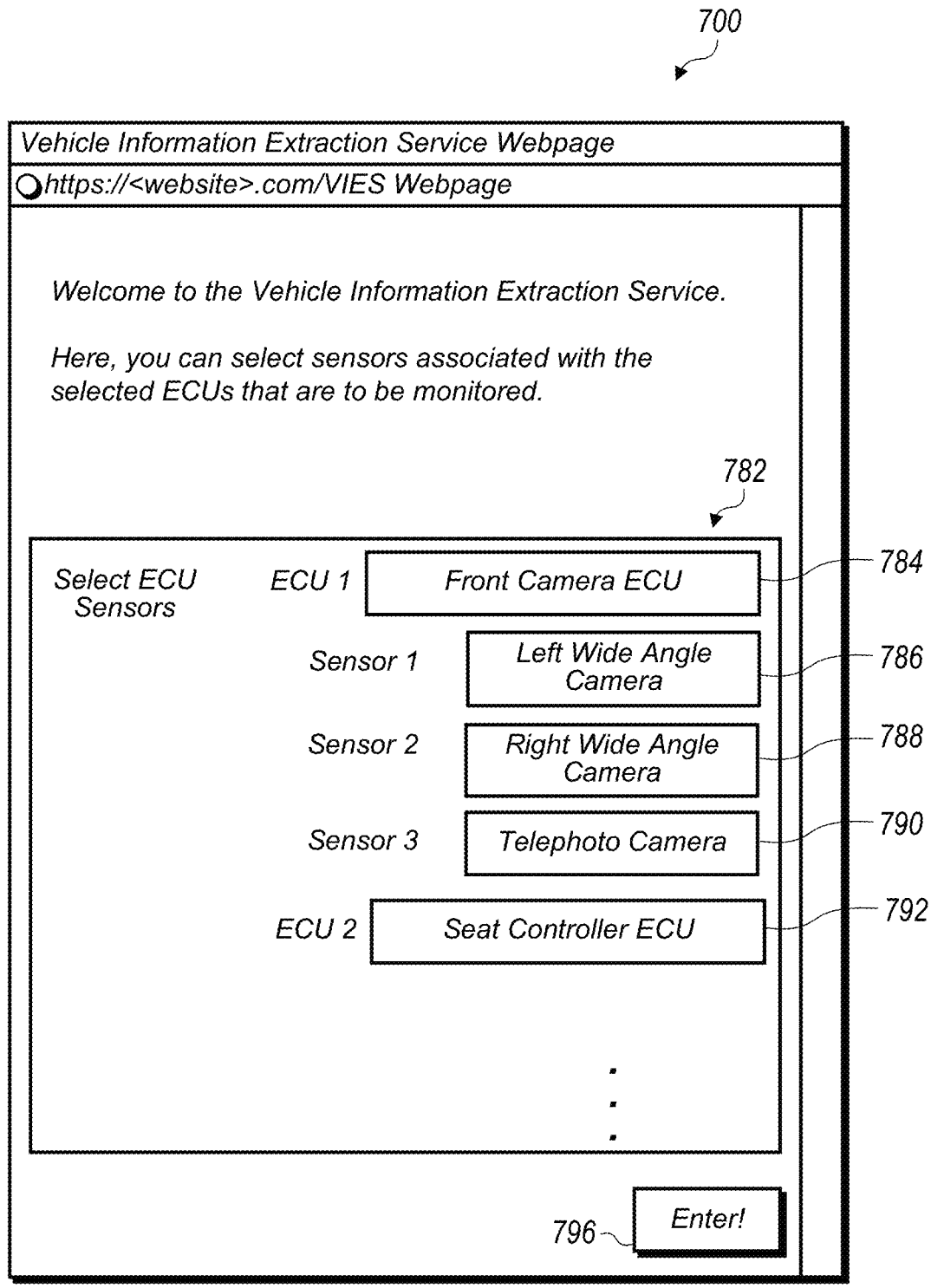

In FIG. 7E, the customer may further select particular sensors connected to the components of the bus that are to be monitored. For example at box 782, the customer has made selections 786-790 for components connected to the front camera ECU (784) and at 794 the customer has selected the seat controller ECU (792). In some embodiments, a customer may select either a sensor or ECU to be monitored, or both. For example, whereas the front camera ECU (784) has multiple attached sensors that may be selected, the seat controller ECU (792) may be a simple ECU without additional sensors connected to it, or with few sensors connected to it. Thus a customer may request to monitor all communications from a given ECU and/or may select to monitor communications for a particular sensor.

In some embodiments, a binary file for a vehicle may be generated based on the inventory of available buses, ECUs, sensors, etc. that are available for monitoring and a configuration file may be generated based on the particular ECUs and sensors that are selected for monitoring, such as via the pages shown in FIGS. 7D and 7E.

Figure 7F:
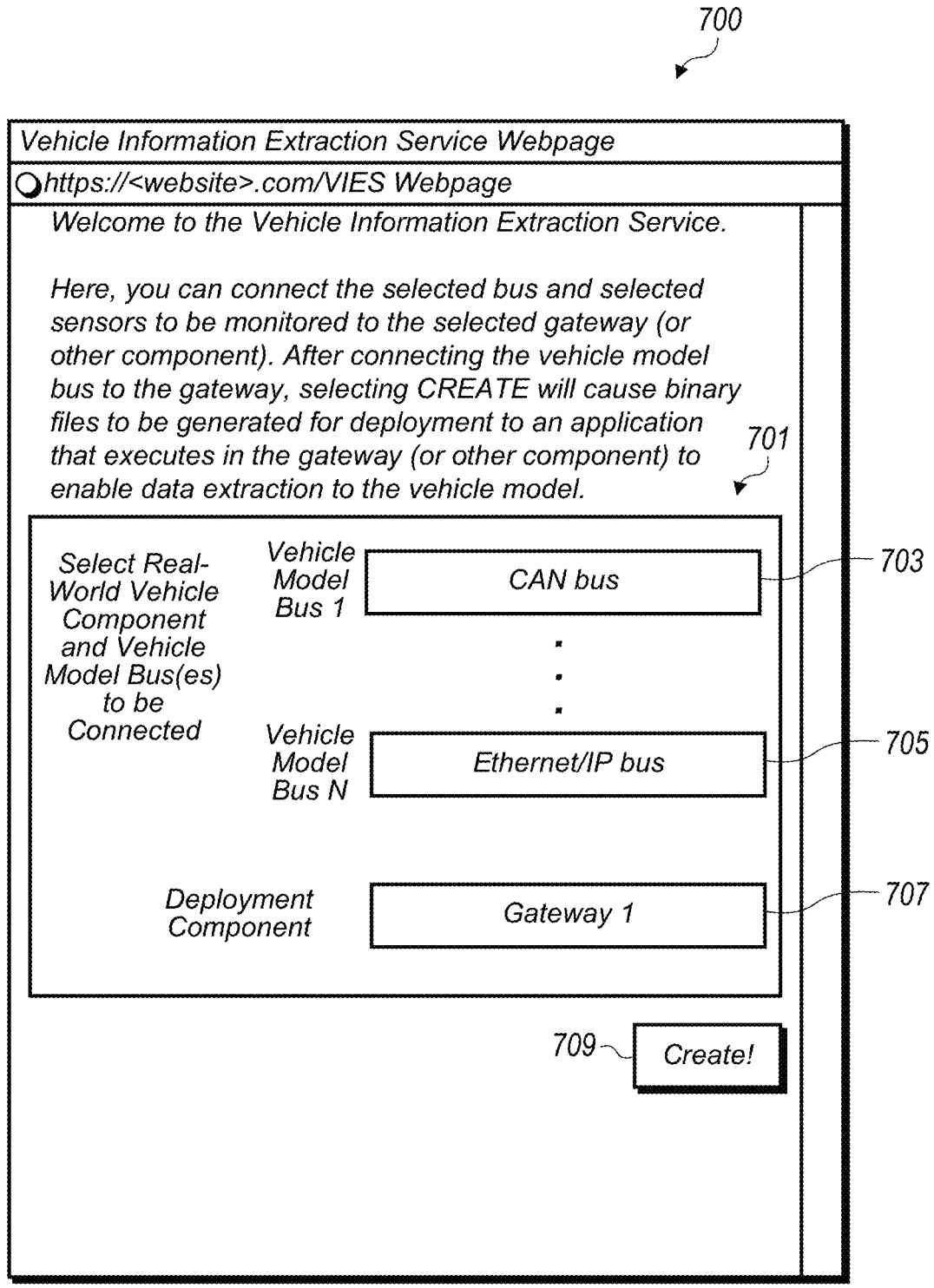

In FIG. 7F, at box 701, the customer may further pair the configured buses that are to be monitored (703 and 705) with the deployment component (707) defined in FIG. 7C and may select button 709 to cause binary files and configuration files to be generated for deployment to the deployment component selected at 707 to enable monitoring of the selected buses 703 and 705, using the monitoring configurations defined in FIGS. 7D and 7E.

Figure 8:
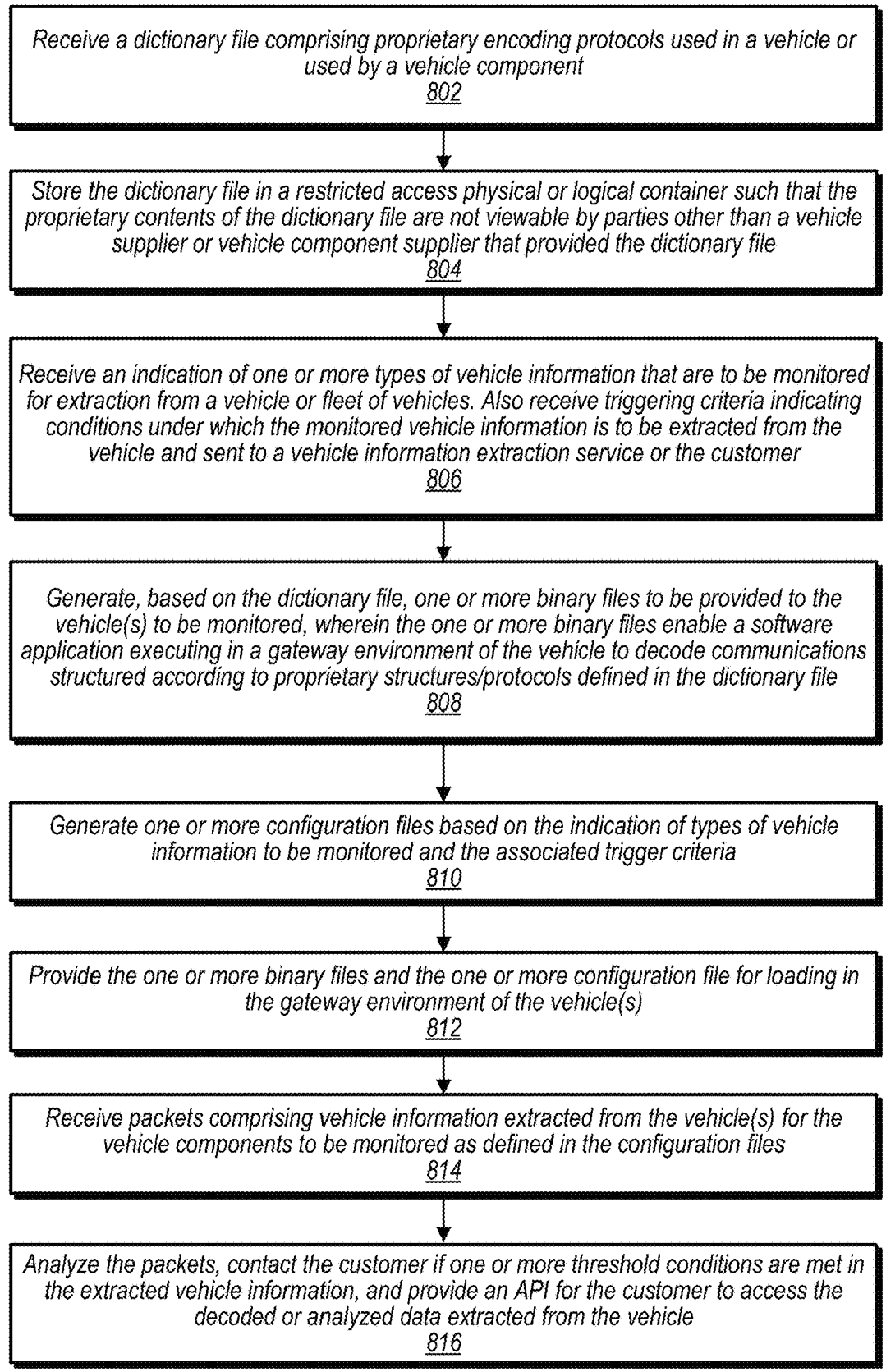
FIG. 8 illustrates a flowchart of operations performed by a vehicle information extraction service to deploy a software package to a vehicle for data monitoring and extraction and also illustrates operations performed by the vehicle information extraction service in response to the requested vehicle information being extracted from the vehicle, according to some embodiments.

FIG. 8 illustrates a flowchart of operations performed by a vehicle information service to deploy a software package to a vehicle for data monitoring and extraction and also illustrates operations performed by the vehicle information service in response to the requested vehicle information being extracted from the vehicle, according to some embodiments.

At block 802, a vehicle information extraction service receives a dictionary file comprising proprietary encoding protocols used in a vehicle or used by a vehicle component.

At block 804, the vehicle information extraction service stores the dictionary file in a restricted access physical or logical container such that the proprietary contents of the dictionary file are not viewable by parties other than a vehicle supplier or vehicle component supplier that provided the dictionary file.

At block 806, the vehicle information extraction service receives an indication of one or more types of vehicle information that are to be monitored for extraction from a vehicle or fleet of vehicles. The vehicle information extraction service also receives triggering criteria indicating conditions under which the monitored vehicle information is to be extracted from the vehicle and sent to a vehicle information extraction service or the customer.

At block 808, the vehicle information extraction service generates, based on the dictionary file, one or more binary files to be provided to the vehicle(s) to be monitored, wherein the one or more binary files enable a software application executing in a gateway environment of the vehicle to decode communications structured according to proprietary structures/protocols defined in the dictionary file.

At block 810, the vehicle information extraction service generates one or more configuration files based on the indicated types of vehicle information to be monitored and the triggering criteria indicated for these types of vehicle information that are to be monitored.

At block 812, the vehicle information extraction service provides the one or more binary files and the one or more configuration files for loading in the gateway environment of the vehicle(s) that are to be monitored.

At block 814, the vehicle information extraction service receives packets comprising vehicle information extracted from the vehicle(s) for the vehicle components to be monitored as defined in the binary files.

At block 816, the vehicle information service coordinates with one or more other services of a provider network to analyze the packets, and contact the customer if one or more threshold conditions are met in the extracted vehicle information. The vehicle information extraction service also provides an API for the customer to access the decoded or analyzed data extracted from the vehicle.

Figure 9:
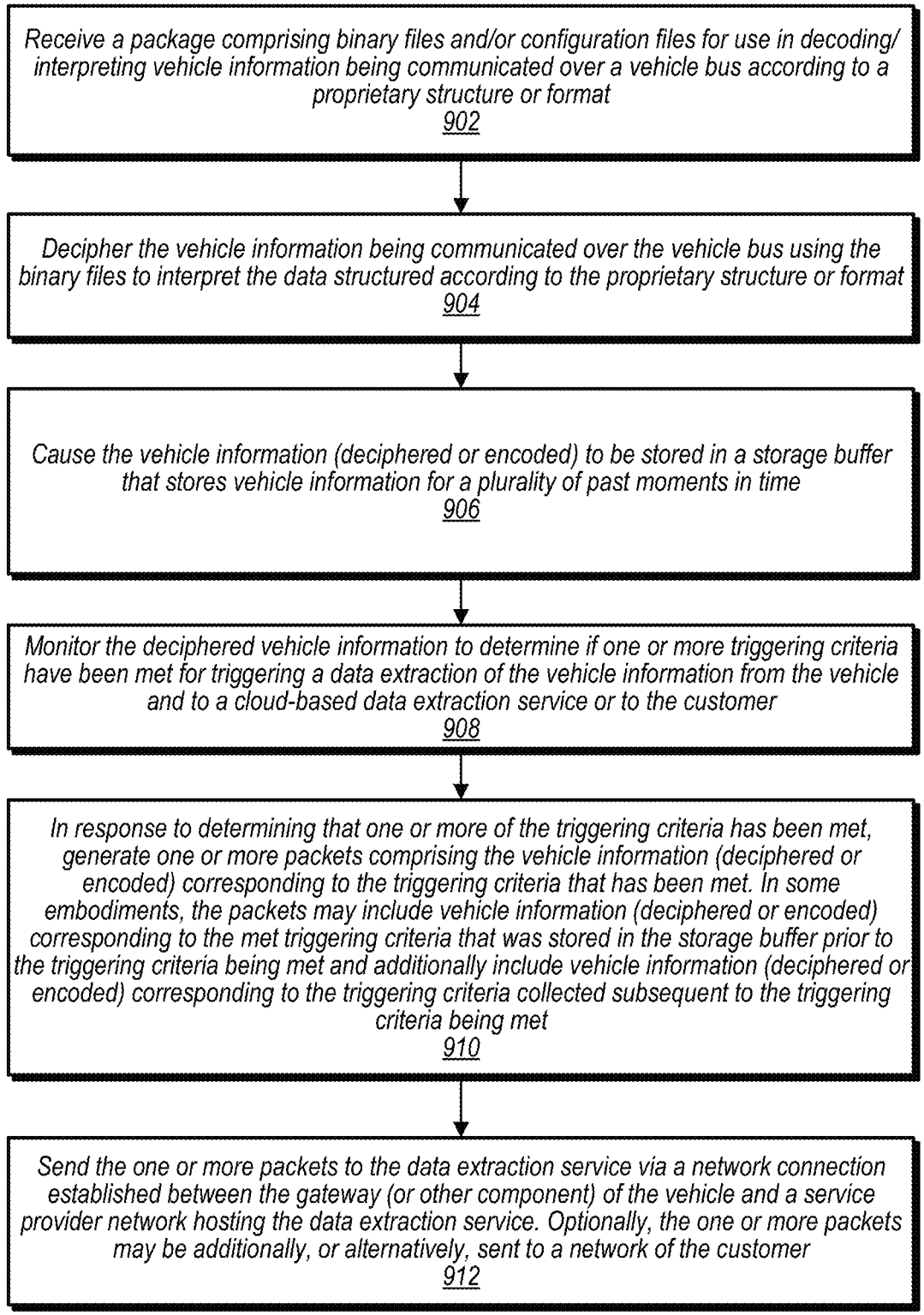
FIG. 9 illustrates a flowchart for operations performed by a software application deployed to a vehicle from a vehicle information extraction service, wherein the software application monitors vehicle bus traffic and extracts vehicle information to be sent to the vehicle information extraction service if one or more triggering criteria are met, according to some embodiments.

FIG. 9 illustrates a flowchart for operations performed by a software application deployed to a vehicle from a vehicle information extraction service, wherein the software application monitors vehicle bus traffic and extracts vehicle information to be sent to the vehicle information extraction service if one or more triggering criteria are met, according to some embodiments.

At block 902, a vehicle information monitoring software application deployed in a vehicle receives a package comprising binary files and/or configuration files for use in decoding/interpreting vehicle information being communicated over a vehicle bus according to a proprietary structure or format At block 904, the vehicle information monitoring software application deployed in a vehicle deciphers the vehicle information being communicated over the vehicle bus using the binary files to interpret the data structured according to the proprietary structure or format.

At block the 906, vehicle information monitoring software application deployed in a vehicle causes the deciphered vehicle information and/or encoded vehicle information to be stored in a storage buffer that stores vehicle information for a plurality of past moments in time.

At block 908, the vehicle information monitoring software application deployed in a vehicle monitors the deciphered vehicle information to determine if one or more triggering criteria have been met for triggering a data extraction of the vehicle information from the vehicle and to a cloud-based data extraction service or to the customer.

At block 910, the vehicle information monitoring software application deployed in a vehicle, in response to determining that one or more of the triggering criteria has been met, generates one or more packets comprising the deciphered (or encoded) vehicle information corresponding to the triggering criteria that has been met. In some embodiments, the packets may include deciphered (or encoded)

vehicle information corresponding to the met triggering criteria that was stored in the storage buffer prior to the triggering criteria being met and additionally include deciphered vehicle information corresponding to the triggering criteria collected subsequent to the triggering criteria being met.

At block 912, the vehicle information monitoring software application deployed in a vehicle sends the one or more packets to the data extraction service via a network connection established between the gateway (or other component) of the vehicle and a service provider network hosting the data extraction service. Optionally, the one or more packets may be additionally, or alternatively, sent to a network of the customer.

Example Computer System

Figure 10:
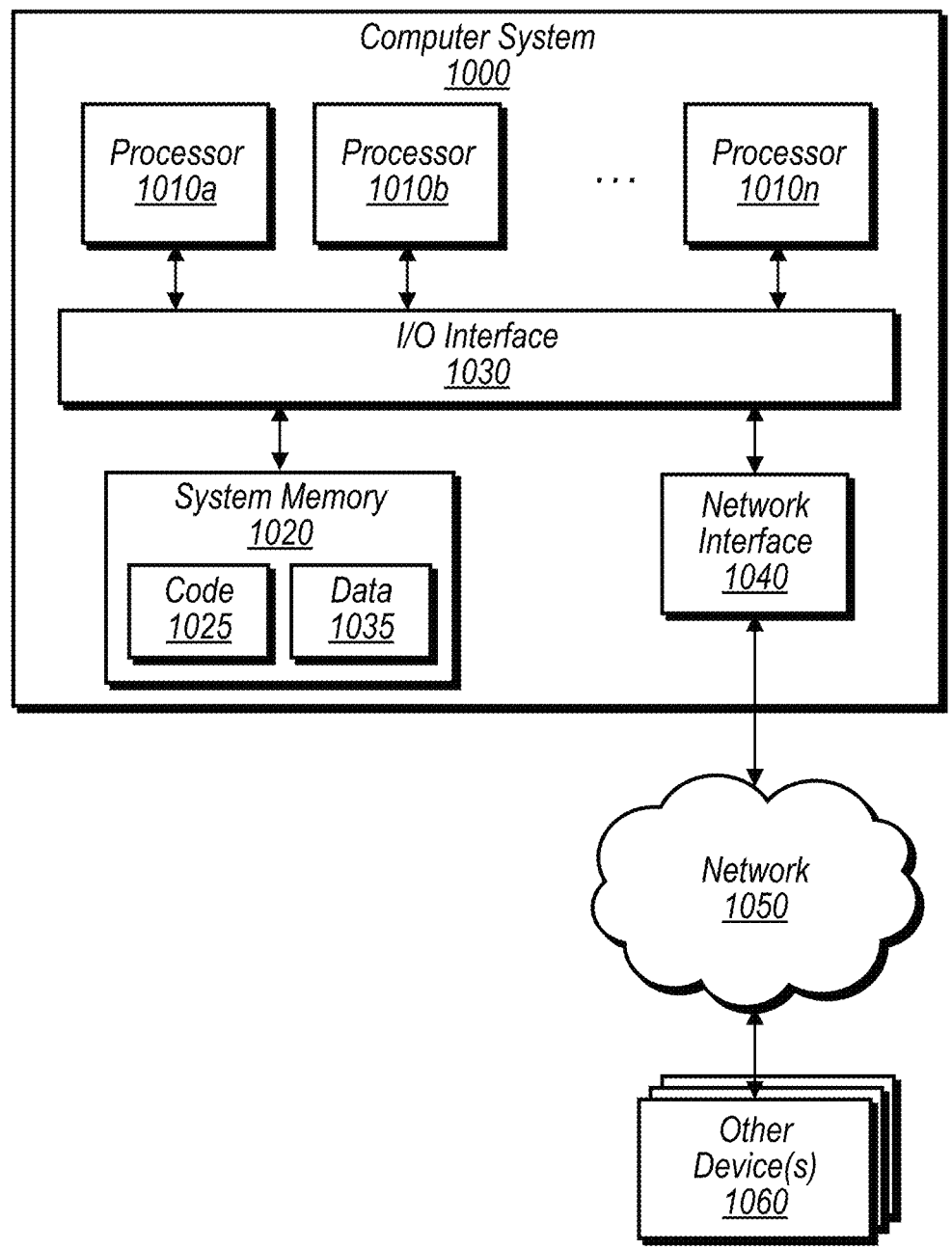
FIG. 10 is a block diagram illustrating an example computer system that implements some or all of the techniques described herein, according to some embodiments.

Any of various computer systems may be configured to implement processes associated with a vehicle information extraction service, a software application/packaged deployed to a vehicle from a vehicle information extraction service, a provider network that implements a vehicle extraction service, an operating system in a vehicle or device, or any other component of the above figures. For example, FIG. 10 is a block diagram illustrating an example computer system that implements some or all of the techniques described herein, according to some embodiments. In various embodiments, the vehicle information extraction service, deployed software package, the provider network that implement the vehicle information extraction service and other cloud services, the operating system in a vehicle or device, or any other component of the above figures FIGS. 1-9 may each include one or more computer systems 1000 such as that illustrated in FIG. 10.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable application, while in other embodiments servers may include more, fewer, or different elements than computer system 1000.

In various embodiments, computing device 1000 may be a uniprocessor system including one processor or a multiprocessor system including several processors 1010A-1010N (e.g., two, four, eight, or another suitable number). Processors 1010A-1010N may include any suitable processors capable of executing instructions. For example, in various embodiments, processors 1010A-1010N may be processors implementing any of a variety of instruction set architectures (ISAs), such as the x86, PowerPC, SPARC, or MIPS ISAs, or any other suitable ISA. In some embodiments, processors 1010A-1010N may include specialized processors such as graphics processing units (GPUs), application specific integrated circuits (ASICs), etc. In multiprocessor systems, each of processors 1010A-1010N may commonly, but not necessarily, implement the same ISA.

System memory 1020 may be configured to store program instructions and data accessible by processor(s) 1010A-1010N. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code (i.e., program instructions) 1025 and data 1035.

In one embodiment, I/O interface 1030 may be configured to coordinate I/O traffic between processors 1010A-1010N, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, I/O interface 1030 may include support for devices attached via an automotive CAN bus, etc. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processors 1010A-1010N.

Network interface 1040 may be configured to allow data to be exchanged between computing device 1000 and other devices 1060 attached to a network or networks 1050. In various embodiments, network interface 1040 may support communication via any suitable wired or wireless general data networks, such as types of Ethernet networks, cellular networks, Bluetooth networks, Wi-Fi networks, Ultra-wideband Networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1000 via I/O interface 1030. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1000 as system memory 1020 or another type of memory. Further, a computer-readable medium may include transmission media or signals such as electrical, electromagnetic, or digital signals, conveyed via a communication medium such as a network and/or a wireless link, such as may be implemented via network interface 1040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. One or more non-transitory computer-readable storage media storing instructions that, when executed on or across one or more processors, cause the one or more processors to:
    cause a dictionary file, received from a vehicle original equipment manufacturer (OEM), to be accessed;
    generate, based on the dictionary file, one or more decoding files to be provided to a vehicle or a fleet of vehicles, wherein the one or more decoding files comprise respective instances of information for use in decoding one or more vehicle messages encoded using an encoding format of the vehicle OEM; and
    cause the one or more decoding files to be provided to the vehicle or the fleet of vehicles for use in decoding vehicle messages communicated via one or more vehicle communication buses, wherein the vehicle messages communicated via the one or more vehicle communication buses are formatted in accordance with the encoding format of the vehicle OEM.

2. The one or more non-transitory computer-readable storage media of claim 1, wherein the one or more decoding files are one or more binary files, and wherein the vehicle OEM is a vehicle supplier or a vehicle component supplier.

3. The one or more non-transitory computer-readable storage media of claim 2, wherein the instructions, when executed on or across the one or more processors, further cause the one or more processors to:
    implement a user interface configured to:
    receive inputs from the vehicle OEM, wherein the inputs define:
        one or more types of vehicle messages that are to be monitored and to be extracted if triggering criteria are met.

4. The one or more non-transitory computer-readable storage media of claim 2 wherein the instructions, when executed on or across the one or more processors, further cause the one or more processors to:
    implement a user interface configured to:
    receive inputs from the vehicle OEM, wherein the inputs define:
        a particular vehicle from which vehicle data is to be extracted;
        a deployment location in the vehicle to which the one or more decoding files are to be deployed;
        a bus of the vehicle that is to be monitored; and
        vehicle components connected to the bus for which a vehicle message is to be extracted if triggering criteria are met.

5. The one or more non-transitory computer-readable storage media of claim 4, wherein the user interface is further configured to receive inputs from the vehicle OEM defining:
    additional buses of the vehicle and vehicle components connected to the additional buses that are to be monitored and for which a vehicle message is to be extracted if the triggering criteria are met.

6. The one or more non-transitory computer-readable storage media of claim 4, wherein the instructions, when executed on or across the one or more processors, further cause the one or more processors to:
    provide an extracted vehicle message to a machine learning service;
    receive, from the machine learning service, recommendations for additional types of vehicle messages to be monitored and/or additional triggering criteria; and
    update one or more configuration files based on the received recommendations.

7. The one or more non-transitory computer-readable storage media of claim 4, wherein the user interface is further configured to receive inputs from the vehicle OEM defining:
    other components of the vehicle for which a license has been granted to share decoded messages that have been decoded using the provided one or more decoding files.

8. One or more non-transitory computer-readable storage media storing instructions that, when executed on or across one or more processors, cause the one or more processors to:
    receive a package comprising one or more decoding files for use in decoding vehicle messages being communicated via one or more communication buses of a vehicle;
    decode at least a portion of the vehicle messages being communicated via the one or more communication buses of the vehicle; and
    generate, in response to one or more triggering conditions being met, one or more packets to be sent to an automotive messaging service, wherein the one or more packets comprise the vehicle messages.

9. The one or more non-transitory computer-readable storage media of claim 8,
    wherein the package further comprises information indicating triggering conditions for extracting a first type of vehicle messages and one or more additional triggering conditions for extracting one or more additional types of vehicle messages, wherein at least some of the respective triggering conditions are different, and
    wherein the instructions, when executed on or across the one or more processors, cause the one or more processors to:

include, in the generated one or more packets, one or more types of vehicle messages for which one or more corresponding triggering conditions are met,
wherein other types of vehicle messages that correspond to other triggering conditions that have not been met are not included in the generated one or more packets.

10. The one or more non-transitory computer-readable storage media of claim 8, wherein the instructions, when executed on or across the one or more processors, further cause the one or more processors to:
in response to the one or more triggering conditions being met, include, in the generated one or more packets, at least some of other vehicle messages comprising audio or visual data from one or more sensors of the vehicle to be sent to the automotive messaging service.

11. The one or more non-transitory computer-readable storage media of claim 10, wherein the decoded vehicle messages comprise text data,
wherein the one or more trigger conditions comprise conditions based on the text data; and
wherein the one or more trigger conditions further comprise an indication of one or more other types of vehicle messages comprising audio or visual data that is to be extracted when the conditions based on the text data are met.

12. The one or more non-transitory computer-readable storage media of claim 8, wherein the package further comprises:
an indication of one or more components of the vehicle that are authorized to receive the decoded vehicle messages or access the decoded vehicle messages stored in a storage buffer of the vehicle,
wherein the instructions, when executed on or across the one or more processors, further cause the one or more processors to:
provide access to the decoded vehicle messages to the one or more components of the vehicle that are authorized to receive or access the decoded vehicle messages.

13. The one or more non-transitory computer-readable storage media of claim 8, wherein the instructions, when executed on or across the one or more processors, further cause the one or more processors to:
monitor the decoded vehicle messages for conditions that satisfy the one or more triggering conditions, wherein the decoded vehicle messages from the one or more buses of the vehicle comprise decoded information from:
one or more controller area network (CAN) buses of the vehicle.

14. The one or more non-transitory computer-readable storage media of claim 13, wherein the decoded information from the one or more buses of the vehicle further comprises decoded information from:

an additional CAN bus of the vehicle; or
an Ethernet or IP bus of the vehicle.

15. The one or more non-transitory computer-readable storage media of claim 8, wherein the instructions are configured to be executed on processors in a gateway environment of the vehicle.

16. A method, comprising
receiving a dictionary file from a vehicle original equipment manufacturer (OEM);
generating, based on the dictionary file, one or more decoding files to be provided to a vehicle or a fleet of vehicles, wherein the one or more decoding files comprise respective information for decoding one or more vehicle messages encoded using an encoding format of the vehicle OEM; and
providing the one or more decoding files to the vehicle or the fleet of vehicles for use in decoding vehicle messages communicated via one or more vehicle communication buses, wherein the vehicle messages communicated via the one or more vehicle communication buses are formatted in accordance with the encoding format of the vehicle OEM.

17. The method of claim 16, further comprising:
implementing a user interface for an automotive messaging service, wherein the user interface is configured to:
receive one or more inputs from the vehicle OEM, wherein the vehicle OEM is a vehicle supplier or a vehicle component supplier, and wherein the one or more inputs define:
one or more types of vehicle messages that are to be monitored and to be extracted if triggering criteria are met.

18. The method of claim 17, wherein the automotive messaging service is further configured to:
receive, from the vehicle, vehicle message packets comprising one or more vehicle messages extracted from the vehicle; and
implement an analytics pipeline configured to perform near real-time monitoring of the received one or more vehicle messages extracted from the vehicle.

19. The method of claim 18, wherein the analytics pipeline is configured to:
analyze an audio or visual vehicle message included in the vehicle message packets; and
verify, based on the analyzed audio or visual vehicle message, one or more artificial intelligence (AI) inferences generated at the vehicle and included in the vehicle message packets.

20. The method of claim 18, wherein the analytics pipeline is configured to:
provide an audio or visual vehicle message and the one or more AI inferences generated at the vehicle to a machine learning algorithm to generate updates for AI inference generation software deployed on the vehicle.

* * * * *